(12) United States Patent
Savini et al.

(10) Patent No.: US 12,037,734 B2
(45) Date of Patent: Jul. 16, 2024

(54) HYDRAULIC CONTROL DEVICE FOR LIQUID-CONDUCTING HOUSEHOLD APPLIANCES AND SYSTEMS

(71) Applicant: ELTEK S.p.A., Casale Monferrato (IT)

(72) Inventors: Paolo Savini, Casale Monferrato (IT); Daniele Cerruti, Casale Monferrato (IT)

(73) Assignee: ELTEK S.p.A., Casale Monferrato (IT)

( * ) Notice: Subject to any disclaimer, the term of this patent is extended or adjusted under 35 U.S.C. 154(b) by 976 days.

(21) Appl. No.: 16/652,856

(22) PCT Filed: Sep. 27, 2018

(86) PCT No.: PCT/IB2018/057483
§ 371 (c)(1),
(2) Date: Apr. 1, 2020

(87) PCT Pub. No.: WO2019/069187
PCT Pub. Date: Apr. 11, 2019

(65) Prior Publication Data
US 2020/0232150 A1 Jul. 23, 2020

(30) Foreign Application Priority Data
Oct. 6, 2017 (IT) .................... 102017000112704

(51) Int. Cl.
*D06F 39/08* (2006.01)
*A47L 15/42* (2006.01)
(Continued)

(52) U.S. Cl.
CPC ........ *D06F 39/081* (2013.01); *A47L 15/4217* (2013.01); *F16K 17/36* (2013.01);
(Continued)

(58) Field of Classification Search
CPC ............................. A47L 15/4217; F16K 17/36
See application file for complete search history.

(56) References Cited

U.S. PATENT DOCUMENTS

| 4,554,828 A | * | 11/1985 | Doll ........................ G01F 15/18 |
| | | | 73/861.12 |
| 2013/0145861 A1 | | 6/2013 | Neven | |
| 2018/0216978 A1 | * | 8/2018 | Dames ................... G01F 15/18 |

FOREIGN PATENT DOCUMENTS

| CN | 105571660 A | * | 5/2016 |
| EP | 1 085 119 | | 3/2001 |

(Continued)

OTHER PUBLICATIONS

CN105571660—Machine Translation (Year: 2016).*
International Search Report and Written Opinion of the ISA for PCT/IB2018/057483 dated Jan. 18, 2019, 14 pages.

*Primary Examiner* — Marc Lorenzi
(74) *Attorney, Agent, or Firm* — Nixon & Vanderhye P.C.

(57) ABSTRACT

A hydraulic control device for liquid-conducting household appliances or systems comprises:—a hydraulic unit (11), having a hydraulic body (15) defining a duct (30) for the liquid, the duct (30) having an inlet (18*i*) and an outlet (31), the duct (30) being at least partially defined with an electrically insulating material, —an electrical valve arrangement (EV, SH) on the hydraulic body (15), which is electrically switchable between a closing position and an opening position, to prevent or enable, respectively, passage of the liquid between the inlet (18*i*) and the outlet (31) of the duct (30), —a flow sensor on the hydraulic body (15). The flow sensor is a non-mechanical flow sensor comprising at least two electrical detection elements (42), prearranged for contact with the liquid that flows in the duct (30) and carried by at least one support (41), that preferably at least partly extends within, or faces the inside of, the duct (30) and/or (Continued)

has two opposite major faces that are substantially parallel to a direction of a flow of the liquid.

4 Claims, 22 Drawing Sheets

(51) Int. Cl.
 *F16K 17/36* (2006.01)
 *D06F 33/47* (2020.01)
 *G01M 3/26* (2006.01)
(52) U.S. Cl.
 CPC ....... *A47L 15/4212* (2013.01); *A47L 2501/01* (2013.01); *D06F 33/47* (2020.02); *G01M 3/26* (2013.01)

(56) References Cited

FOREIGN PATENT DOCUMENTS

| EP | 1085119 A2 * | 3/2001 | ........... D06F 39/081 |
|----|---|---|---|
| EP | 1 798 326 | 6/2007 | |
| JP | H08-19499 A | 1/1996 | |
| JP | 2013-117531 A | 6/2013 | |
| WO | 2012/140592 | 10/2012 | |
| WO | 2013/061516 A1 | 5/2013 | |
| WO | 2017/017463 | 2/2017 | |

\* cited by examiner

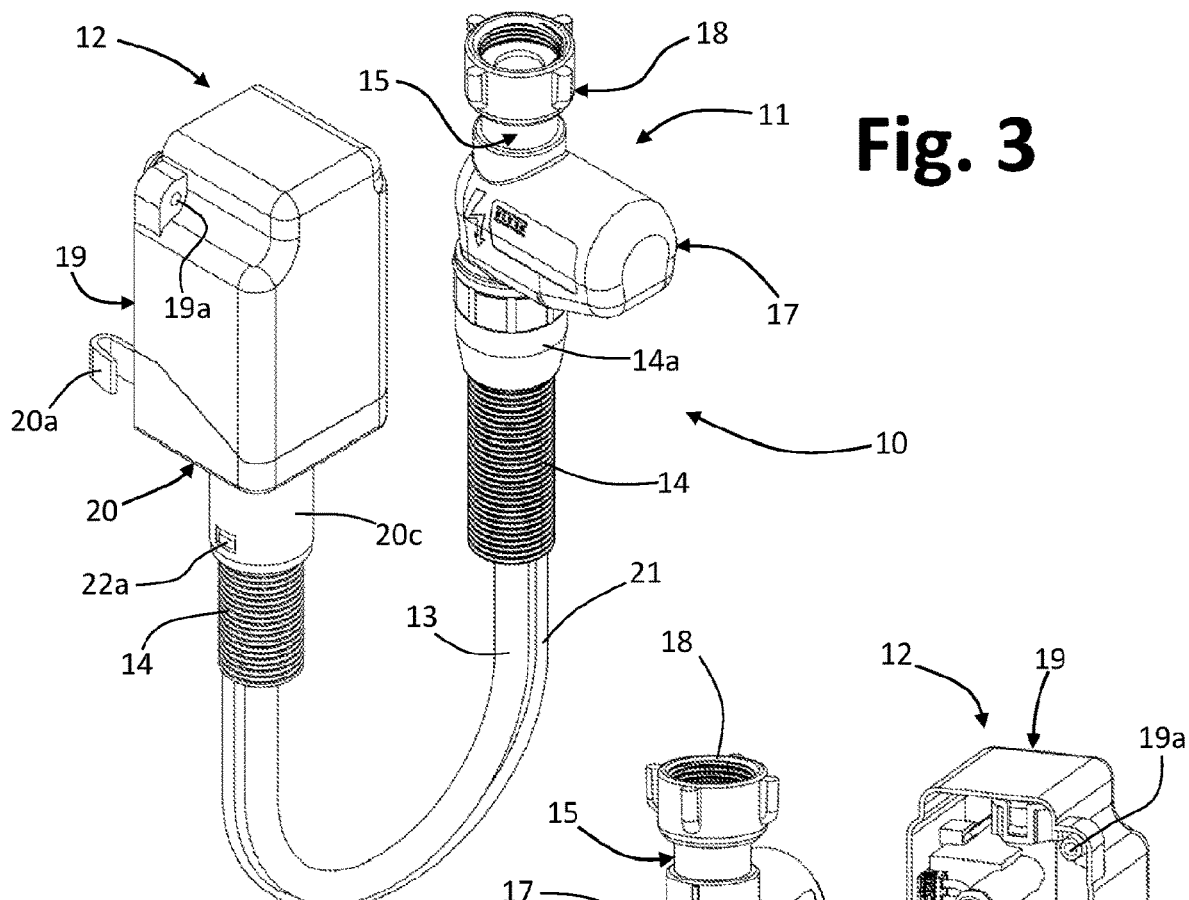
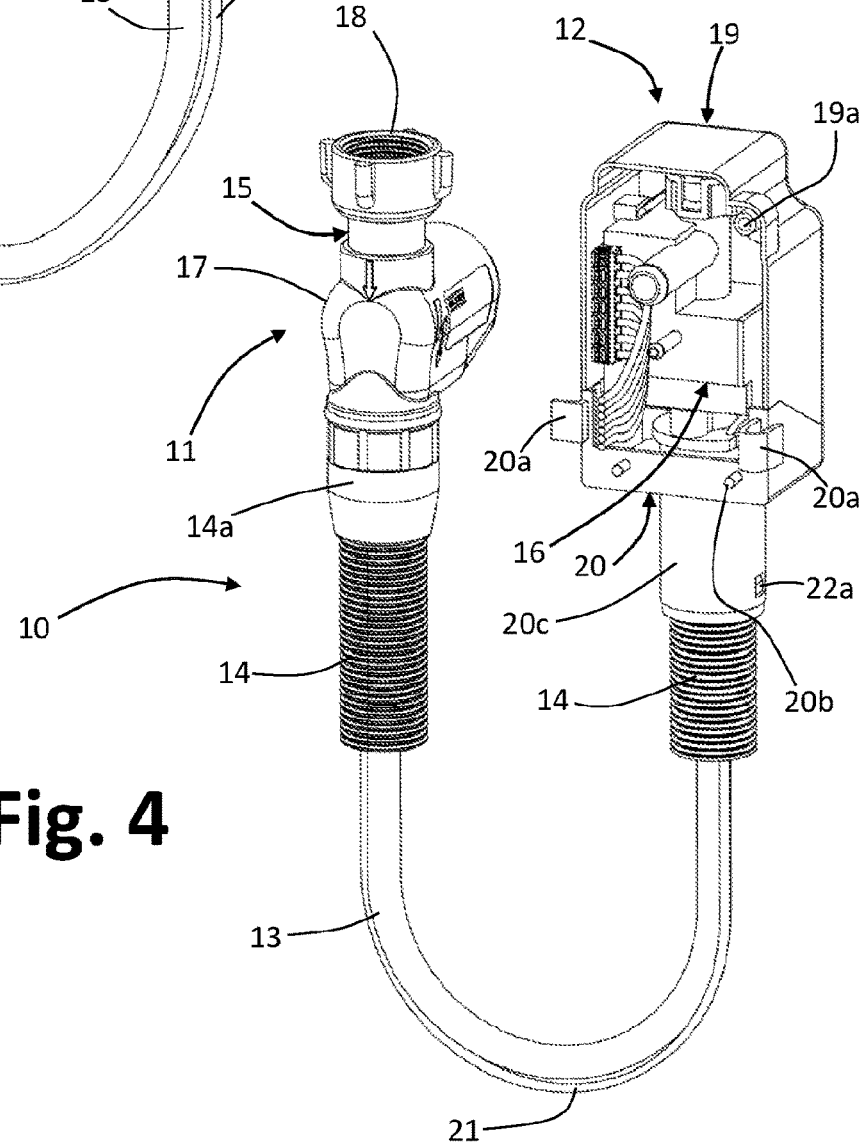

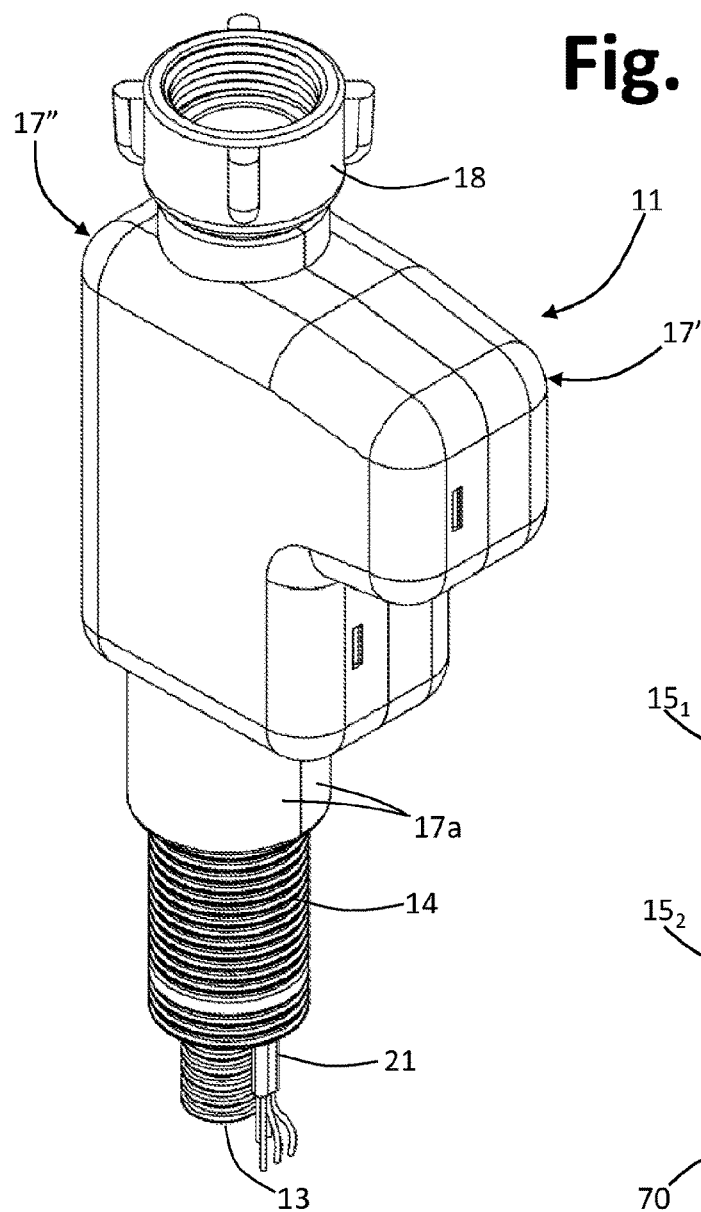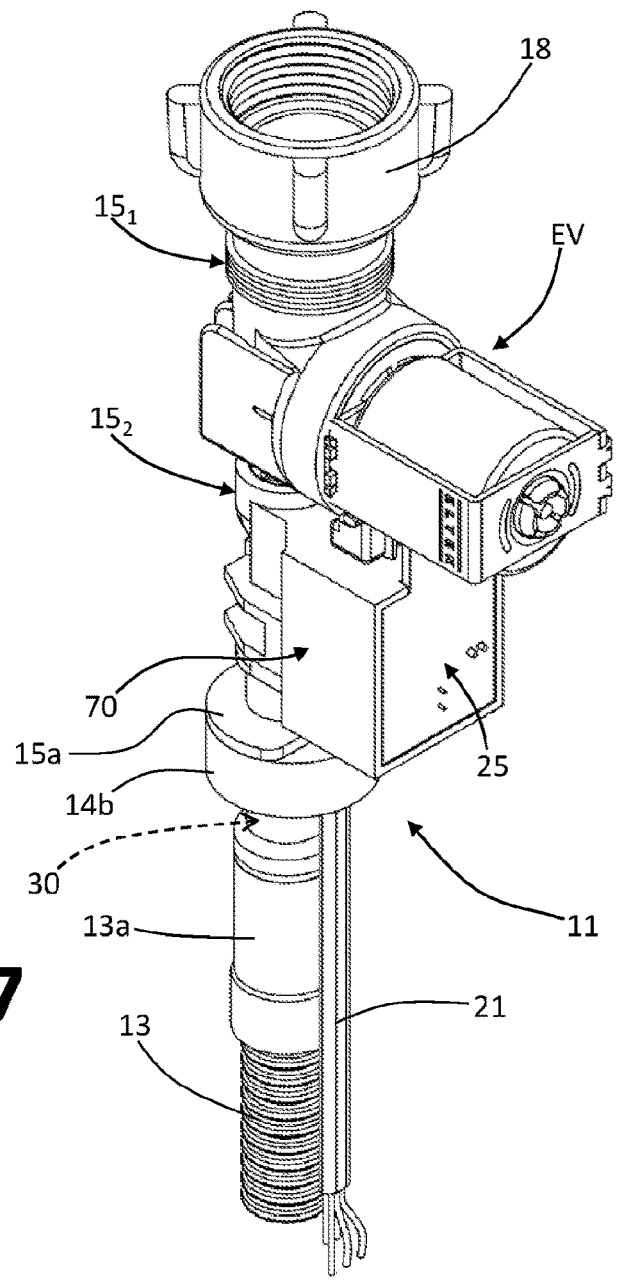
Fig. 16
Fig. 17

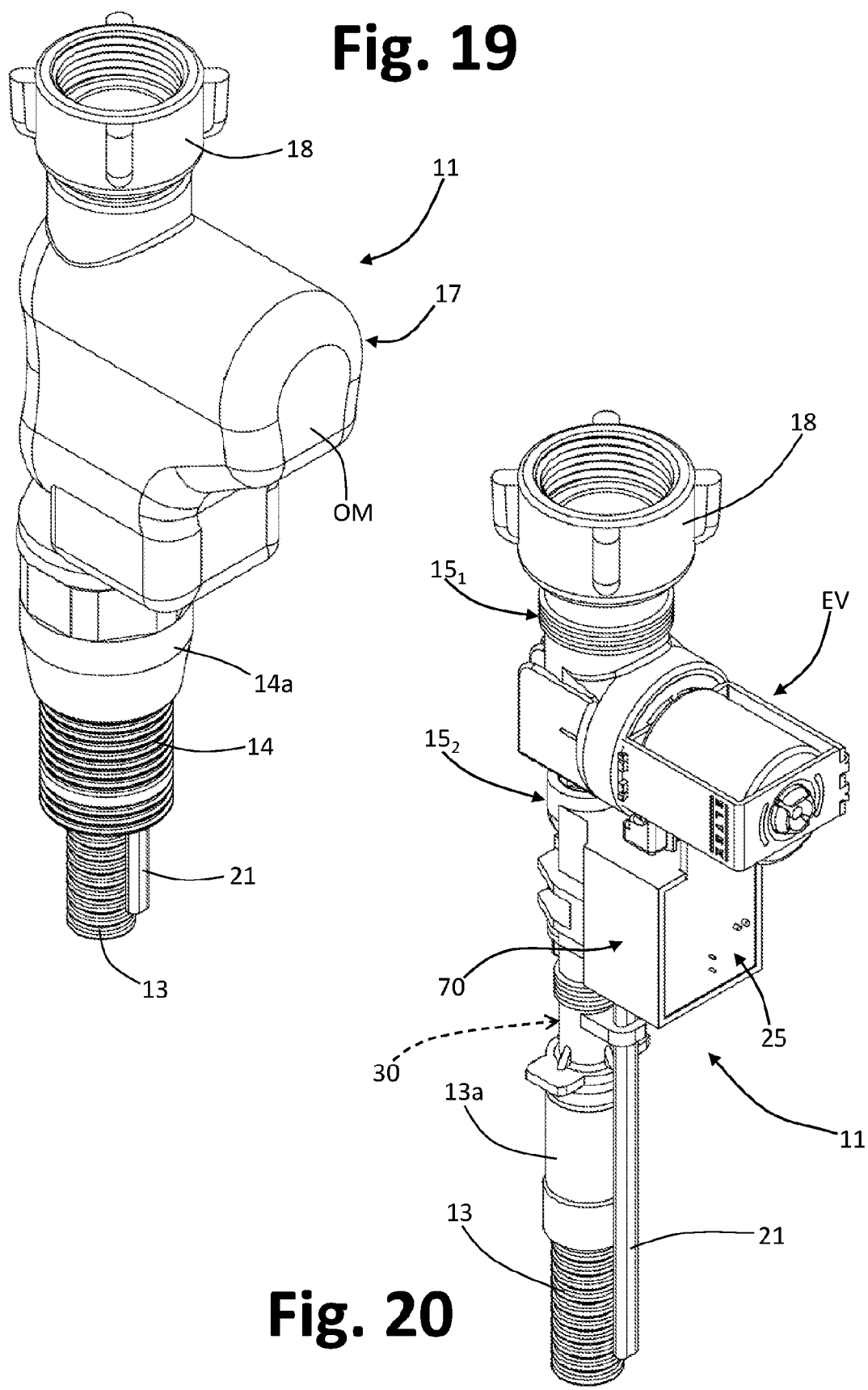

HYDRAULIC CONTROL DEVICE FOR LIQUID-CONDUCTING HOUSEHOLD APPLIANCES AND SYSTEMS

This application is the U.S. national phase of International Application No. PCT/IB2018/057483 filed Sep. 27, 2018 which designated the U.S. and claims priority to IT Patent Application No. 102017000112704 filed Oct. 6, 2017, the entire contents of each of which are hereby incorporated by reference.

FIELD OF THE INVENTION

The present invention relates to hydraulic control devices for liquid-conducting household appliances and systems, such as for example devices for the control of liquid supply and anti-flooding safety devices, prearranged for connection between a liquid supply source and an appliance using such liquid, such as a dishwasher or a washing machine.

More in particular, the invention regards such a hydraulic control device that comprises at least
- at least one hydraulic or connector unit, having a hydraulic body defining a duct for the liquid, said duct having an inlet and an outlet and being defined at least in part with an electrically insulating material,
- an electrical valve arrangement on the hydraulic body, which is electrically switchable between a closing position and an opening position, to prevent or enable, respectively, passage of the liquid between the inlet and the outlet of said duct, and
- a flow sensor on the hydraulic body.

STATE OF THE ART

Hydraulic control devices for liquid-conducting appliances and systems of the type referred to, in particular electrical household appliances, are widely known, for example for use on laundry-washing machines and dishwashers. Typically, the aforesaid devices comprise at least one hydraulic unit having a corresponding body, hereinafter also referred to as valve body, which is equipped with flow sensor and a valve arrangement, typically an electro-valve, including an open/close element which is controllable in order to open and close the duct in the internal duct of the valve body.

Some of these devices are provided for metered supply of water to the corresponding appliance, wherein dosage is accomplished based on a flow-rate detection carried out by the flow sensor. In general, after the electric valve has been opened, the detection carried out via the flow sensor enables to calculate the volume of water that flows in the hydraulic body and, one a preset amount has been attained, reclosing of the electric valve is controlled. The electric valve is usually controlled by a control system of the served appliance or systems, to which control system also receives the signal generated by the flow sensor. The flow sensor can also be exploited to accomplish certain safety functions: for example, detection of a flow-rate in absence of electrical supply to the electric valve (i.e., during a step of an operating program of the served appliance that does not provide for the opening of the electric valve) may be considered representing a malfunctioning or fault of the same valve.

In devices of this type the flow sensor is of a mechanical type, based upon the use of an impeller driven in rotation by the inlet water, and on a corresponding sensing unit that is able to measure the velocity of rotation of the impeller, i.e., the number of revolutions thereof per unit time. For this purpose, the impeller typically includes one or more magnetic inserts, and the sensing unit is usually of the Hall-effect type, set in a position aligned with the impeller, on the outside of the duct in which the water flows. A solution of this type is known, for instance, from EP 0599341 A, in the name of the present Applicant.

Other hydraulic control devices for liquid-conducting appliances and systems—generally known as anti-flooding safety devices—have a structure specifically prearranged to prevent any possible leakage water coming from a supply pipe from leaking into the domestic environment, thus causing flooding. To this purpose, the supply pipe—here also referred to as inner pipe—extends longitudinally at least in part within a second pipe—here also referred to as outer pipe—in such a way that between at least part of the two pipes a gap is defined, able to collect possible leakage water. In these safety devices, the valve arrangement is meant to closes the duct that is inside the corresponding body, in the case where leakage of water is detected.

In a first type of known solutions, the outer pipe and the gap are open at the bottom, i.e., at their distal end, towards the inside of the electrical household appliance, where a tray for collection of any possible leakage water is provided. Within this tray a sensor is provided, which may be of an electromechanical type (for example, a float with a micro-switch associated thereto) or else mechanical (based upon expansion of an anhydrous sponge, which increases in volume in contact with a liquid). Irrespective of the type of sensor, the arrangement is such that, upon detection of water within the tray, the sensor generates a control signal (electrical, pneumatic, or mechanical, according to the cases), which causes switching of the valve arrangement provided in the valve body, and hence closing of the water-inlet duct. In this way, in the presence of failure of the inner water-inlet pipe, further inflow is prevented, and hence the risk of flooding. These safety devices present the advantage of interrupting supply of water even in the case where the leakage is not due to a failure of the inner pipe of the anti-flooding safety device, but rather to failures in different hydraulic components mounted inside the electrical household appliance. A disadvantage of these devices, however, is that, in the case where the above safety device goes into action, it is not possible to know immediately whether the water collected in the tray is due to a leakage of a component inside the electrical household appliance or else to malfunctioning or failure of the dual-pipe safety device.

There have also been proposed anti-flooding safety devices of a second type, which are simpler than the ones described previously and do not presuppose a particular prearrangement of the electrical household appliance. In this second type of devices, the gap defined between the inner pipe and the outer pipe is substantially closed at the two ends so as to be able to collect any possible water leaking from the inner pipe into the outer pipe (i.e., into the gap between the two pipes). Some of these devices base their operation upon the use of an anhydrous sponge, which is operatively set at the valve body, in fluid communication with the gap. The anhydrous sponge is usually coupled to a stop member, mounted movable between a position of retention and a position of release of the open/close element of a mechanical valve. When the sponge is in its anhydrous condition, the aforesaid stop member withholds the open/close element in the position of opening of the duct. In the case of a leakage, the water collected in the gap rises until it comes into contact with the sponge, thus causing an increase in volume of the latter and hence a displacement of the stop member towards the position of release, in such a way that the open/close element of the valve can close the water-inlet duct under the pressure of the water. An anti-flooding safety device of this type is known, for example, from the German patent DE 3618258 C filed in the name of the present Applicant (this document moreover describes safety devices of the first type mentioned above).

Other devices of the second type mentioned base their operation upon the rise in pressure that occurs within the gap following upon leakage from the inner pipe. The leakage water that flows into the gap causes a rise in pressure within the latter, such as to cause deflection of a membrane associated to which is the stop member, which thus moves from the position of retention to the position of release of the open/close element of the mechanical valve, with the latter that closes the inlet duct under the pressure of the water. An anti-flooding safety device of this type is known, for example, from the international patent application WO 2012/140592 filed in the name of the present Applicant.

Also in certain anti-flooding safety devices a flow meter is integrated, on the type previously indicated, which is useful for operation of the device itself or of the served electrical household appliance. Solutions of this type are described, for example, in EP 517 293 A and EP 1 085 119 A filed in the name of the present Applicant.

In some cases (see, for example, EP 517 293 A) the impeller is of an axial type, i.e., it belongs to an assembly that is inserted within the duct in which the water flows, defined in the connector body that integrates an electrical valve of the safety device; the sensing unit is, instead, mounted on the connector body on the outside of the water duct. In other cases (see, for example, EP 1 085 119 A) the impeller is, instead, of a tangential type and belongs to a component that integrates also the sensing unit, with this component that is prearranged for being coupled in a fluid-tight way in a purposely provided seat of the connector body that integrates the electrical valve of the safety device, in fluid communication with the duct defined by the latter.

Integration of a flow sensor in a hydraulic control device according to the prior art—both in the case of a dosing device and in the case of an anti-flooding safety device—is in general a source of problems, given that known impeller flow sensors are potentially subject to sticking. This sticking may be due, for example, to the presence of impurities in the water coming from the water mains, such as sand or iron residue, which can deposit over time between the blades of the impeller and the body that houses it, and thereby cause sticking of the impeller itself. Known sensors that envisage moving mechanical parts are also subject to inevitable wear, which can cause imprecision of detection and are barely suitable for detection of very small flow-rates of water (for example, of a few millilitres per minute), which typically occur in the case of minor leaks or dripping from the valve arrangement of the device or from the connection between the inner pipe and one of the connector bodies.

Aim and Summary of the Invention

In its general terms, the aim of the present invention is basically to solve one or more of the aforesaid drawbacks of the known art, and in particular to provide a control device of the type indicated that is distinguished by an improved precision and/or sensitivity and/or reliability of detection, in particular over the long term, as compared to known devices designed for similar applications.

The above and other aims still, which will emerge more clearly hereinafter, are achieved according to the present invention by a hydraulic control device for liquid-conducting household appliances and systems having the characteristics specified in the annexed claims. The claims constitute an integral part of the technical teaching provided herein in relation to the invention.

BRIEF DESCRIPTION OF THE DRAWINGS

Further aims, characteristics, and advantages of the invention will emerge clearly from the ensuing detailed description, with reference to the annexed drawings, which are provided purely by way of explanatory and non-limiting example and in which:

FIGS. 3 and 4 are partial and schematic perspective views, from different angles, of a hydraulic control device according to possible embodiments of the invention;

FIG. 16 is a perspective view of a hydraulic unit of a hydraulic control device according to further possible embodiments of the invention;

FIG. 17 is a schematic perspective view of the hydraulic unit of FIG. 16, without a corresponding casing, a body made of resin, and an outer pipe;

FIG. 19 is a perspective view of a hydraulic unit of a hydraulic control device according to further possible embodiments of the invention;

FIG. 20 is a schematic perspective view of the hydraulic unit of FIG. 19, without a corresponding overmoulded casing and an outer pipe;

DETAILED DESCRIPTION OF PREFERRED EMBODIMENTS OF THE INVENTION

Reference to "an embodiment", "one embodiment", "various embodiments", and the like in the course of this description is meant to indicate that at least one particular configuration, structure, or characteristic described in relation to an embodiment is comprised in at least one embodiment. Hence, phrases such as "in an embodiment", "in one embodiment", "in various embodiments", and the like that may be present in various points of this description do not necessarily refer to one and the same embodiment, but may, instead, refer to different embodiments. Moreover, particular conformations, structures, or characteristics defined in the course of this description may be combined in any adequate way in one or more embodiments, even different from the ones represented. The reference numbers and spatial references (such as "upper", "lower", "top", "bottom", "front", "back", "vertical", etc.) used herein, in particular with reference to the examples in the figures, are only provided for convenience and hence do not define the sphere of protection or the scope of the embodiments. In the present description and in the attached claims, the generic term "liquid" is to be understood as comprising water or other liquids used in the field of household appliances, including mixtures and solutions containing water and/or other liquids. Likewise, the generic definition "liquid-conducting appliances and systems" must be understood as comprising all those devices, appliances, apparatuses, and systems that are supplied or that, more in general, use at least one liquid. In the figures, the same reference numbers are used to designate elements that are similar or technically equivalent to one another.

Figure 1:
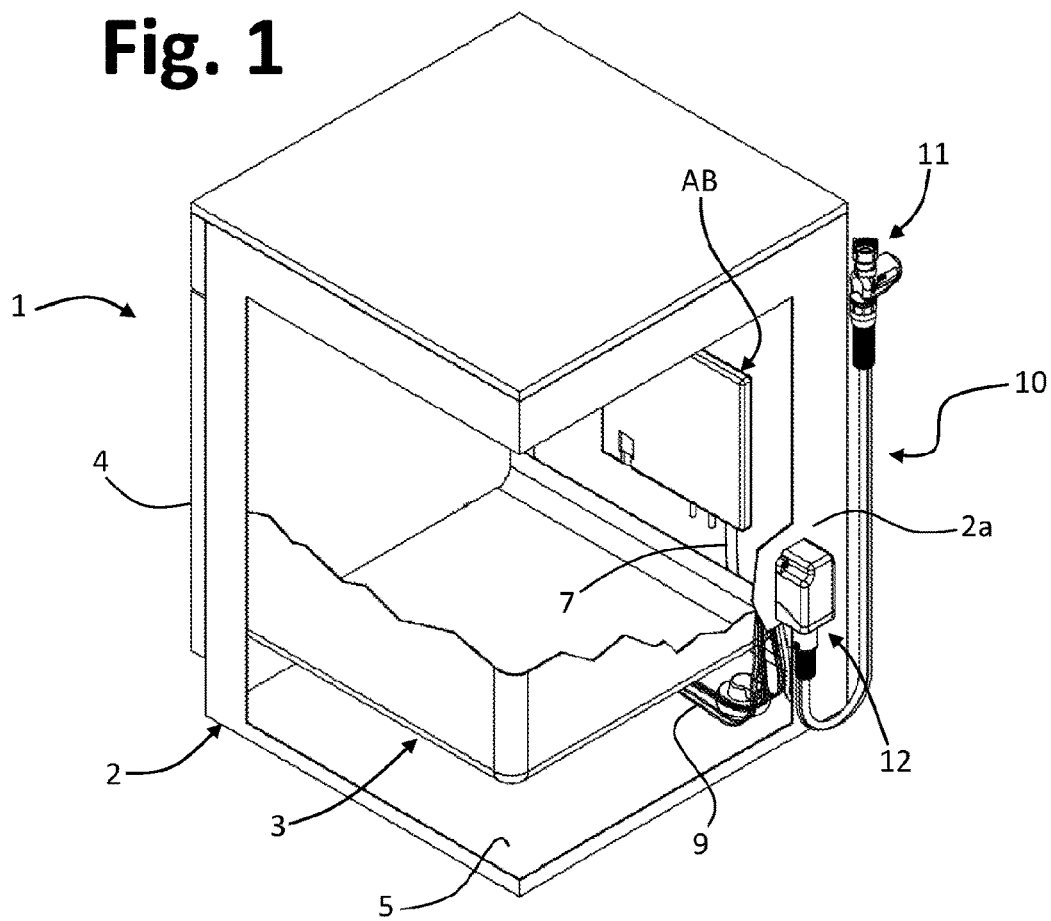
FIG. 1 is a partially sectioned schematic perspective view of a liquid-conducting household appliance equipped with a hydraulic control device according to possible embodiments of the invention.
Figure 2:
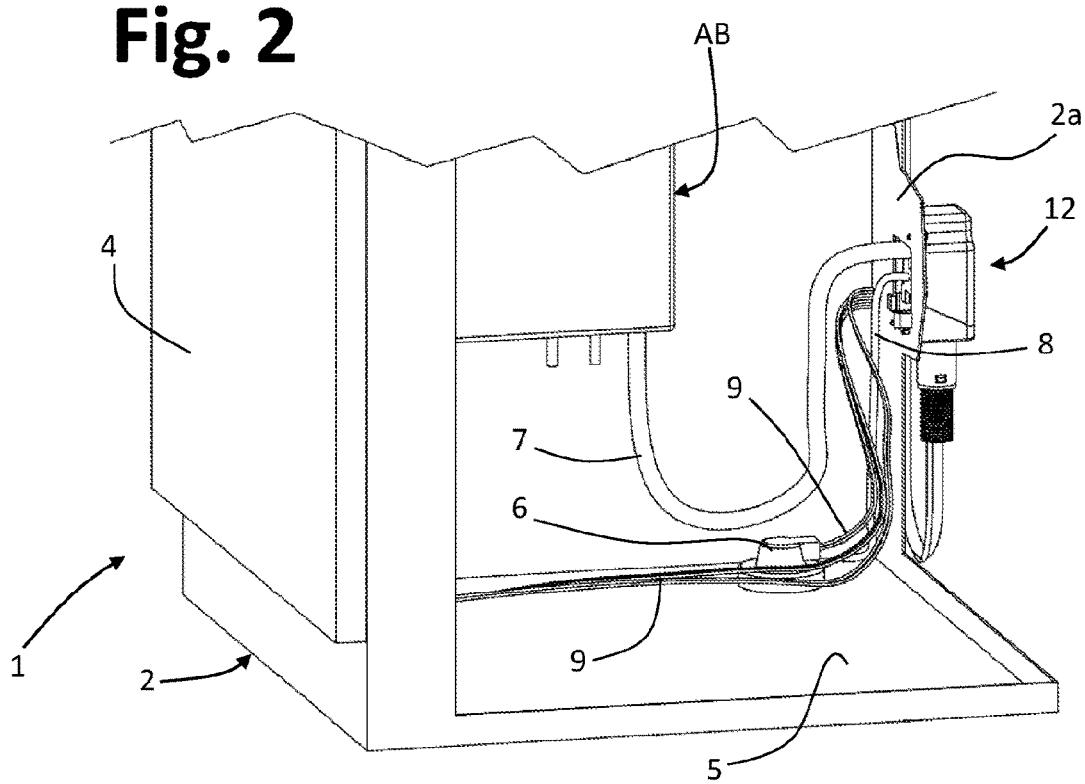
FIG. 2 is a schematic perspective view of a portion of the household appliance of FIG. 1.

In FIGS. 1 and 2, designated as a whole by 1 is a liquid-conducting household appliance, in particular a machine for washing, here represented by way of example by a dishwasher. The household appliance could, however, be of some other type, such as a laundry-washing machine, a hydraulic thermo-sanitary device, a boiler, an air-conditioning apparatus, etc.

According to a technique in itself known, the dishwasher 1 has a cabinet or load-bearing structure 2, which houses a wash tub 3. The wash tub 3 is open at the front, at a door 4 for loading and unloading the dishes to be washed. Set underneath the wash tub 3, inside the structure 2, is a collection tray 5, located within which is a water sensor, for example including a float and a micro-switch, of the type referred to in the introductory part of the present description.

The aforesaid sensor is designated by 6 in FIG. 2, where the representation of the wash tub 3 has been omitted for reasons of clarity of representation. The sensor 6 is in any case designed to detect the presence of water in the tray, both in the case of leakage from a component inside the dishwasher 1 and in the case of leakage from a hydraulic control device of the type performing anti-flooding safety functions, as explained in the introductory part of the present description.

The dishwasher 1 is, in fact, equipped with a safety device against leaks of water, provided according to possible embodiments of the invention. This safety device, designated as a whole by 10, comprises at a first end a first hydraulic or connector unit, designated as a whole by 11, designed for connection to a water-supply source, for example a tap of a domestic water mains, not represented. The device 10 comprises, at the opposite end, also a second hydraulic or connector unit, which, depending on the specific embodiment, may integrate or not a circuit arrangement, as described hereinafter.

In various embodiments, as in the case illustrated in FIGS. 1-2, the second connector unit, designated by 12, integrates at least one circuit arrangement and is designed to be associated to the dishwasher 1, in particular in a rear region of the latter. As will be seen, extending between the two units 11 and 12 is a first flexible pipe for charging the appliance with water, also referred to hereinafter as "inner pipe", which is at least partially surrounded by a second, protection, flexible pipe, also referred to hereinafter as "outer pipe", in such a way that defined between the two pipes is a gap for collecting and/or conveying possible water leaking from the inner pipe, as explained in the introductory part of the present description. In various embodiments, the aforementioned gap is closed at its upper end, or at the unit 11.

In the case exemplified, the unit 12 is mounted on a rear wall 2a of the cabinet 2 of the dishwasher, at an opening of the latter. In other embodiments, the unit 12 may be mounted at an opening provided in a rear wall of the wash tub 3.

In the example illustrated, the unit 12 is connected in fluid communication with a functional unit forming part of a system for supplying the water to the dishwasher itself, for example, a unit AB integrating a known air-break device, from which the water is then made to flow into the wash tub 3. The fluidic connection between the unit 12 and the unit AB is provided via a pipe 7. Finally, designated by 9 are some conductors of a wiring for connection of the sensor 6 to the aforesaid circuit arrangement of the device 10 and for connection of the circuit arrangement itself to a control system of the dishwasher, for the purposes of electrical supply of the device 10 and for carrying electrical signals, for example electrical signals representing values of flow-rate of the water drawn into the machine through the device 10 itself and/or of signals representing detections made via the sensor 6 (if present) and/or of electrical signals representing a detection of leakage water inside the device 10, as explained hereinafter.

A device 10 according to possible embodiments is schematically represented in FIGS. 3 and 4, where the aforesaid inner and outer flexible pipes are designated by 13 and 14, the pipe 14 being represented only partially. The inner pipe 13 for intake of water may be a pipe with a smooth surface, for example, made of elastomeric material, and the outer protection pipe 14 may be a corrugated pipe, made, for example, of thermoplastic material. In possible variant embodiments, on the other hand, both of the pipes 13 and 14 may be corrugated pipes made of thermoplastic material (as exemplified in FIGS. 12-13) or, conversely, may both be pipes with a smooth surface. In what follows, it is assumed that both of the pipes 13 and 14 are corrugated pipes, although the corrugations of the inner pipe 13 are not represented in FIGS. 3-4.

Designated by 15 and 16 are two hydraulic or connector bodies, belonging to the units 11 and 12, respectively, preferably made of electrically insulating material, for example, a thermoplastic material. Designated by 17 is a casing of the connector body 15, which may, for example, be a casing made of electrically insulating plastic material overmoulded on the body 15 (and on a corresponding valve arrangement). Designated by 14a is a sleeve or pipe coupling, made, for example, of elastomeric material directly overmoulded on the proximal end of the outer pipe 14, for coupling the pipe 14 to the casing 17 and/or to the connector body 15, preferably in a fluid-tight way. Designated by 18 is a threaded ring-nut, associated with modalities in themselves known to the connector body 15, used for connection to the water source.

Designated by 19 and 20 are two parts of a box-shaped casing, open at the front, for the connector body 16 with the associated circuit arrangement. In the example, the casing part 20 is also configured for providing the connection of the outer pipe 14, as clarified hereinafter. The casing part 20 may be mechanically connected to the corresponding wall 2a of the dishwasher by means of one or more mechanical engagement elements, such as the ones designated by 19a. The casing 19-20 may as a whole also be fixed to the structure of the dishwasher 1 with at least one fixing screw, of which designated by 19a is the passage hole (the screw is designated by 19b in FIGS. 11 and 12). One or both of the casing parts 19, 20 may also include contrast elements for precise positioning on the dishwasher, for example in the form of pins designed to be inserted in corresponding holes provided in the wall 2a (one of these pins is designated by 20b in FIG. 4). In any case, the modalities of construction, mounting, and fixing of the casing of the unit 12 may differ from the ones exemplified. For example, the casing could be made of a single piece, or else of more than two pieces. Also the mechanical engagement elements could be of some other type, for example, complementary engagement elements in part associated to the electrical household appliance and in part associated to the safety device 10 (such as quick-coupling engagement elements).

Designated by 21 is a wiring for electrical supply of an electrical valve arrangement of the unit 11, for example, a solenoid electric valve of a type commonly used in the sector of hydraulic control devices (both in case of dosing devices and in case of anti-flooding safety devices). This electric valve is not visible in FIGS. 3 and 4, in so far as it is covered by the casing 17, but similar electric valves are visible, for example, in FIGS. 17-18 and 20-21, where they are designated by EV. The electric valve may be, for example, of a normally closed type, or configured in such a way that—in the absence of electrical supply thereto—a corresponding open/close unit (for example, with a membrane, such as the one designated by the reference SH in FIGS. 17-18 and 20-21) will keep closed a duct defined inside the connector body 15, which is connected to the source of the water via the ring-nut 18. Instead, during operation of the dishwasher, when it becomes necessary to load in water from the water mains, the control system of the dishwasher itself supplies the aforesaid electric valve for the time necessary to enable passage of water through the aforesaid duct, and hence towards the inner pipe 13, for loading the water into the machine. As per known technique, the duration of opening of the electric valve is determined by the control system of the dishwasher and terminates when the necessary amount of water, which may, for example, be detected via a flow sensor, has been loaded into the wash tub 3.

In various embodiments, the unit 12 is configured for mechanical connection of the pipes 13 and 14 to the back of the dishwasher 1 and for electrical connection of the device 10 to the control system of the dishwasher itself.

In various preferred embodiments, the unit 12 is prearranged for the purposes of measurement of the flow-rate of water that flows in the water-intake inner pipe 13, as described hereinafter. In addition or as an alternative, in various embodiments, the unit 12 of the device 10 is prearranged for detecting any possible water leaking from the aforesaid electric valve of the unit 11, as well as for detecting any possible water leaking from the inner pipe 13, as described hereinafter.

Figure 5:
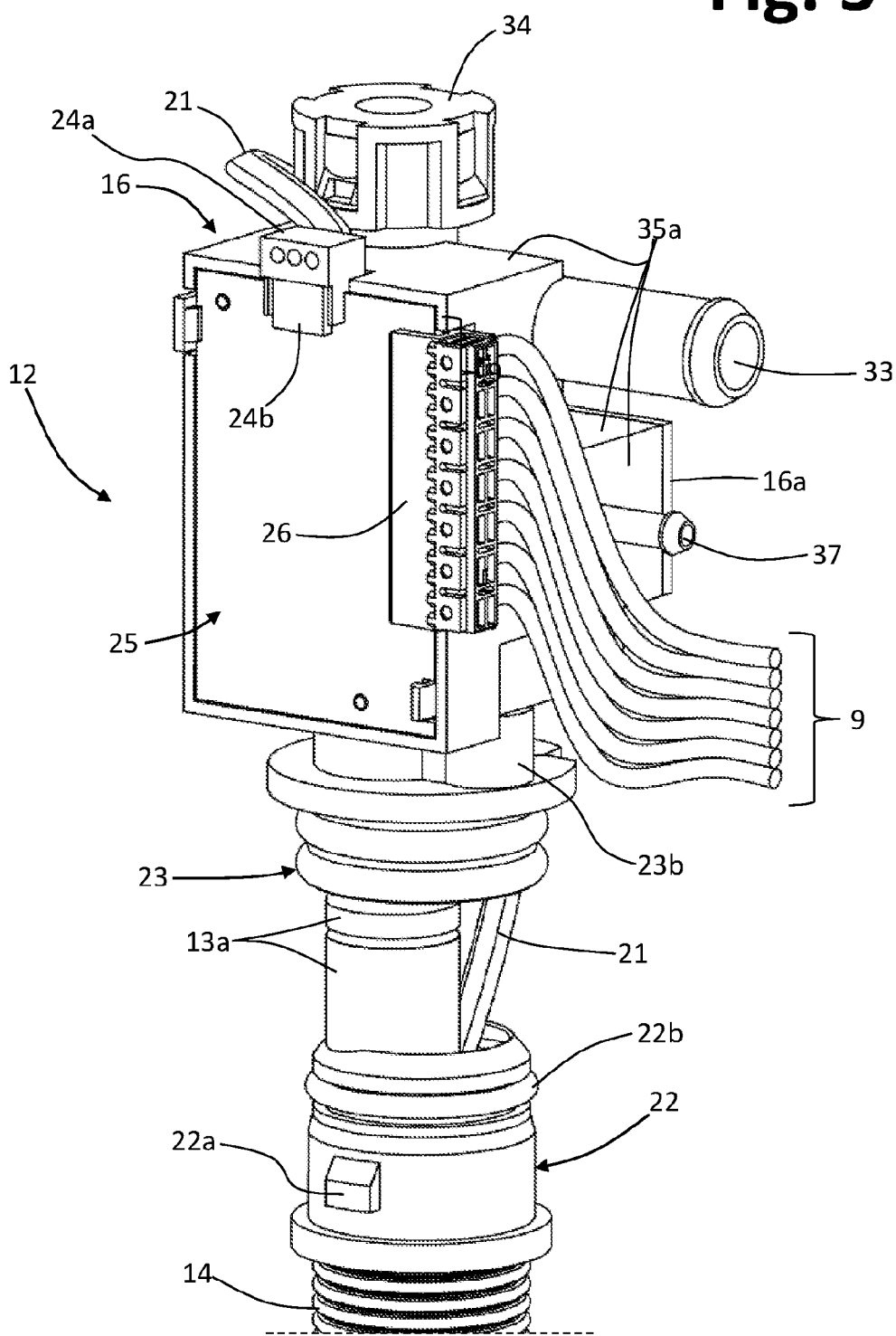
FIG. 5 is a partial and schematic perspective view of a hydraulic unit of a hydraulic control device according to possible embodiments of the invention, without a respective casing.

In FIG. 5 a sensing unit 12 is shown without the respective casing body 19-20. In this figure, it may be noted how, in various embodiments, to the distal end of the outer pipe 14 there may be associated (for example, by overmoulding) a fixing terminal 22, which has on the outside respective teeth or reliefs 22a prearranged for engagement in corresponding seats defined in a substantially tubular portion 20c of the casing part 20 (see FIGS. 3 and 4). The terminal 22 may possibly define on the outside a seat for a seal ring 22b in order to improve the characteristics of fluid-tightness between the outside of the pipe 14 itself and the inside of the tubular portion 20a of the casing part 20.

In various embodiments, a sealing member or gasket, designated by 23, is provided, mounted on the connector body 16 and basically having the function of protecting the inside of the casing 19-20 from water that has possibly gathered in the gap between the two pipes 13 and 14. As will be seen, on the other hand, the sealing member 23 has at least one passage aimed at enabling flow of the leakage water towards a purposely provided detection volume or chamber.

Also visible in FIG. 5 is the electrical cable 21 for supplying the aforesaid electric valve of the unit 11, which is preferably contained within the gap between the two pipes 13 and 14. The cable 21, which in the example passes through the gasket 23, can terminate with a connector 24a (for example, of a rast-2.5 type) which can be connected to a complementary connector 24b that is provided on a circuit support or PCB 25, mounted on the connector body 16. The cable 21 could also be directly connected to the circuit support or PCB 25, in the absence of a connector. To the same circuit support 25 there may be connected a multipolar connector 26, which, via the conductors 9 (see also FIGS. 1-2), is preferably envisaged, in the case of electrical connection of the device to the control system of the dishwasher 1 or to an electrical mains supply.

As will be seen, in various preferential embodiments, the connector 26 enables, with a single connection, control of various functions of the sensing unit 12.

Figure 6:
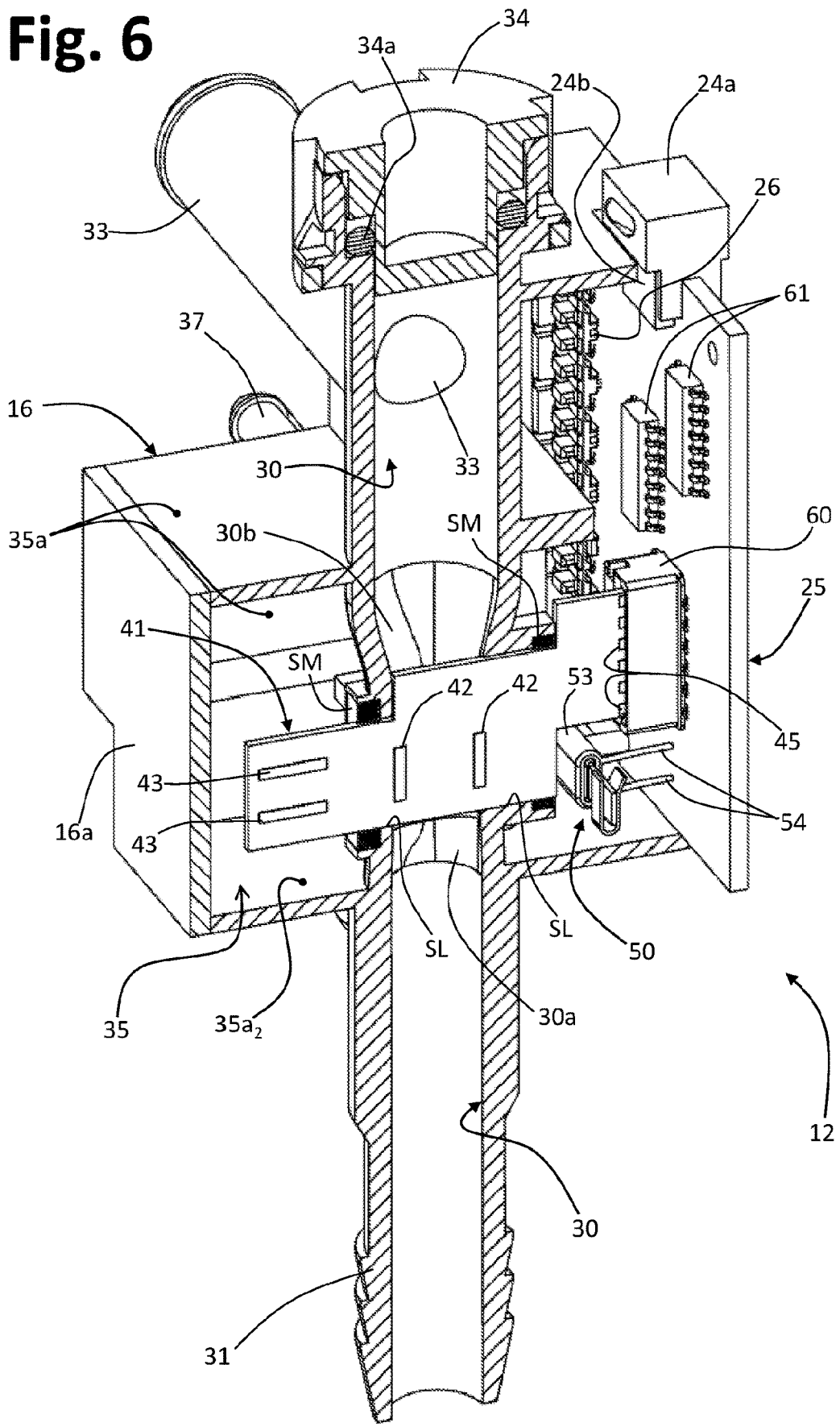
FIG. 6 is a sectioned perspective view of the hydraulic unit of FIG. 5.
Figure 7:
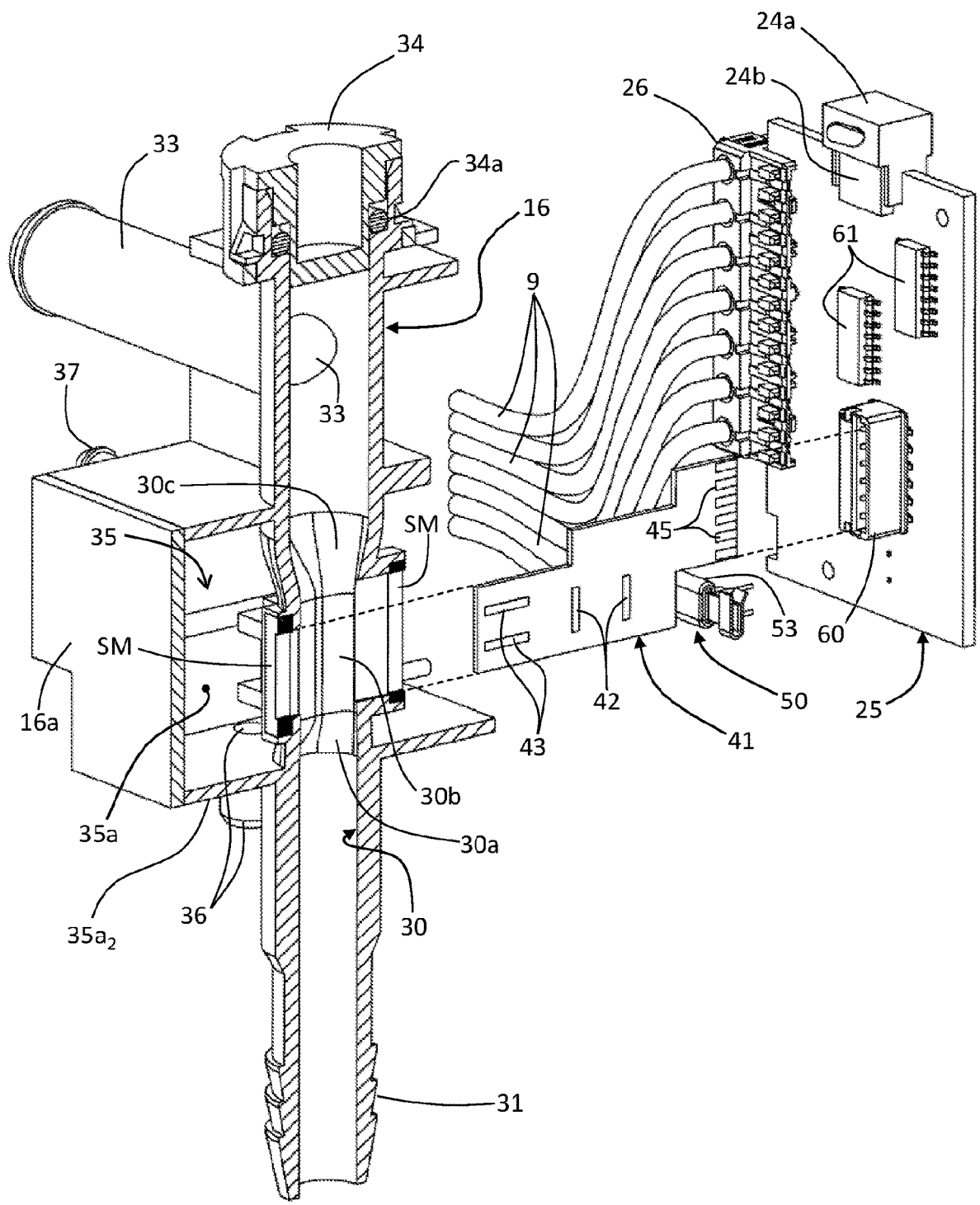
FIG. 7 is a partially exploded view of the hydraulic unit of FIG. 6.

With reference also to FIGS. 6 and 7, in various embodiments, the connector body 16 defines inside it a duct 30 for flow of the water supplied via the inner pipe 13. For this purpose, the body 16 defines an inlet attachment 31, fitted on which is the distal end of the inner pipe, when this is made of elastomeric material. In various embodiments, such as the one exemplified, at the distal end of the inner pipe 13 a sleeve 13a made of elastomeric material is provided, partially visible in FIG. 5, which is fitted on the attachment. The sleeve 13a may be mounted or overmoulded on the distal end region of the pipe 13 (see, for reference, also FIGS. 12-13).

Defined in a part of the duct 30 generally opposite to the inlet attachment 31 is an outlet attachment 33, which enables outflow of the water from the duct itself. With reference to the example of FIGS. 1 and 2, the pipe 7 is designed to be connected to the outlet attachment 33. In various embodiments, the attachment 33 extends radially in a transverse direction from the duct 30, i.e., from the connector body 16 (according to some embodiments, the inlet attachment 31 is hence preferably angled with respect to the outlet attachment 33).

Preferably, as explained hereinafter, a region of the duct 30 that is intermediate between the attachments 31 and 33 is distinguished by a restricted section of passage, where electrical detection elements or electrodes are arranged. For this reason, the body 16 that defines the duct 30 may comprise a number of parts. In various preferred embodiments, in an upper part thereof opposite to the inlet attachment 31, the duct 30 extends axially beyond the attachment 33, with the connector body 16 that is designed accordingly open in order to enable moulding of the aforesaid intermediate region of the duct 30. The open upper end of the duct 30 defined by the body 16 is occluded by means of a closing member or plug 34, preferably provided with a seal ring 34a. As an alternative, the passage with restricted section could be defined in a first part of the body 16 that comprises the outlet attachment 31, associated to a second part of the body 16 that defines the inlet attachment 33, or vice versa.

In various embodiments, the sensing unit 12 has a detection volume or chamber, which has an inlet, in fluid communication with the gap between the pipes 13 and 14, and an outlet, preferably designed to be set in fluid communication with the inside of the dishwasher 1, in particular with its collection tray 5.

In various preferential embodiments, the aforesaid detection volume is at least partially defined by the connector body 16 itself that defines the duct 30 for the water. As an alternative, the aforesaid volume may be defined by a further body associated to the connector body 16, for example, fixed in a fluid-tight way or welded thereto. For example, with reference once again to FIGS. 6 and 7, the connector body 16 may be moulded so as to define a series of walls—some of which are designated by 35a, for example, in FIGS. 5-7—which are arranged adjacent to or around the duct 30 so as to delimit part of a detection chamber, designated by 35. In the example, the chamber 35 is further delimited, on one side, by a lid 16a coupled in a fluid-tight way on the body 16, i.e., at the ends of some of the walls 35a, and, on the opposite side, by a further wall $35a_1$ of the body 16 (visible only in FIG. 14), generally facing the circuit support 25, with the latter that is in this way on the outside of the chamber 35. The lid 16a may be mounted mechanically or via welding (for example, ultrasonic or hot-blade welding) or via gluing.

In various embodiments, the lower wall of the chamber 35—designated by $35a_2$ in FIGS. 6 and 7—has a respective inlet attachment, designated by 36 in FIG. 7: as will be seen, the inlet attachment 36 is designed to be set in fluid communication with the gap defined between the two pipes 13 and 14, in particular by way of a passage of the gasket 23 and a gap internal to the tubular portion 20c of the casing part 20.

In various embodiments, one of the side walls 35a of the chamber 35, in particular a wall that is in a position corresponding to the outlet attachment 33, is in turn provided with a respective outlet attachment 37, partially visible, for example, in FIGS. 5-7. Preferably, the outlet attachment 37 is at a greater height than the inlet attachment 36, in such a way that, as will be seen, within the chamber 35 there can accumulate a certain amount of leakage water. Once again preferably, the outlet attachment 37 faces in the same direction as the outlet attachment 33; i.e., the two attachments are substantially parallel to one another. In various embodiments, a pipe that has the purpose of setting the detection chamber 35 in communication with the inside of the dishwasher 1, in particular with its collection tray, is designed to be connected to the outlet attachment 37. For example, with reference to FIGS. 1 and 2, designated by 8 is a pipe having one end connected to the outlet attachment 37 and the opposite end that opens into the tray 5.

In various embodiments, the hydraulic control device according to the invention integrates, in at least one of its hydraulic or connector units, a flow or flow-rate sensor, designed to generate signals or information that can be used by the control system of the household appliance in which it is installed. For example, with reference to the case so far exemplified, the information that can be derived from the aforesaid flow sensor may be used by the control system of the dishwasher for the purposes of measurement and/or dispensing of the amount of water to be loaded each time into the wash tub 3, in order to execute a dish-washing programme, and/or may be used for detecting leaks or faults of closing of the electric valve EV.

According to an inventive aspect, the flow sensor of the hydraulic control device according to the invention is a non-mechanical flow sensor, i.e., one that does not envisage moving parts such as an axial impeller or a tangential impeller typically provided according to the prior art. The non-mechanical flow sensor includes at least two electrical detection elements, for example in the form of electrodes or tracks of electrically conductive material (for example, made of metal or pastes with a graphite base), within a duct for the water of a corresponding hydraulic or connector unit, in particular defined by a corresponding hydraulic or connector body of the hydraulic or connector unit (such as the duct 30 defined by the body 16 of the connector unit 12).

In various embodiments, the non-mechanical flow sensor includes at least one support, preferably planar and/or relatively rigid and straight, for at least one of the electrical detection elements. In various preferential embodiments, the at least one support faces or is at least partially inserted in the duct for the liquid of the device, in such a way that the at least one electrical detection element can be reached by the liquid that flows in the corresponding duct. The aforesaid support could in any case be of a different type, such as a flexible and/or shaped support, for example designed to adapt to, or having a shape substantially complementary to that of, at least part of a wall of the duct for the liquid. The mentioned support could extend in a substantially central position of the duct, or else in a staggered or lateral position of the duct, or at least in part in a position corresponding to a wall of the duct, with the liquid that laps the at least one electrical detection element on at least one side or face of the support.

In various preferential embodiments, the at least one support is at least partially inserted through the aforesaid duct for the water in such a way that the at least one electrical detection element can be lapped by the water that flows in the corresponding duct, preferably in an area close to the wall of the duct.

In various embodiments, the non-mechanical flow sensor is an electromagnetic-induction flow or flow-rate sensor. The operating principle of electromagnetic-induction flow sensors, based upon Faraday's law, is in itself known and consequently will not be discussed in detail. Here it is sufficient to recall that, for the purposes of operation of such a sensor, the flow of a fluid that flows in an electrically insulated duct of a given diameter is made to pass through a magnetic flux of a given intensity, in a direction substantially perpendicular to the direction of the fluid. If the fluid is electrically conductive, which is typically the case of mains water, in this way a potential difference is induced that can be detected by means of two electrodes in contact with the fluid, aligned substantially perpendicular to the direction of the flow of the fluid and of the magnetic field. The potential difference that can be measured via the electrodes is proportional to the mean velocity of the liquid in the duct.

In various embodiments, the flow sensor hence comprises an electromagnetic arrangement, prearranged for generating an electromagnetic field in a direction transverse to the flow of the liquid in the aforesaid duct (such as the duct 30), and a detection arrangement, which comprises at least two electrodes for detecting a potential difference induced by the flow of the liquid through the electromagnetic field, the two electrodes being arranged within the duct, and hence in contact with the liquid the flow-rate of which is to be measured. Preferably, the at least two electrodes for detection of the potential difference are carried by one and the same support, for example, a single planar support, inserted in a transverse direction into the duct for passage of the liquid, preferably having two opposite faces that are substantially parallel to the direction of flow of the liquid. On the other hand, not excluded from the scope of the invention is the case of use of two supports, for example both planar, each of which carries at least one respective detection electrode, which are both designed to be inserted in a transverse direction into the duct where the liquid flows, in generally parallel positions.

As will be seen, in possible alternative implementations of the invention, the non-mechanical flow sensor is a hot-wire or hot-film sensor. Also a flow sensor of this type may comprise at least one corresponding support set substantially at the centre of the duct for the liquid, or else in a staggered or lateral position of the duct, or may itself define at least in part a wall of the duct, with the liquid that laps at least one electrical detection element on at least one side or face of the support.

According to an inventive aspect, in addition or as an alternative to a flow sensor (which may itself provide a leakage sensor, as explained hereinafter), the hydraulic control device according to the invention, when configured as an anti-flooding safety device, comprises a leakage sensor, prearranged for detecting any possible leakage water that flows into the gap between its two flexible pipes, for example water deriving from leakages from the connections between the pipe 13 and the bodies of the connector units 11 and/or 12 and/or deriving from failure of the inner pipe.

In various embodiments, the leakage sensor comprises a pair of electrodes for detecting the presence of water, which are arranged in a detection volume (such as the chamber 35), defined in one of the hydraulic or connector units of the safety device, in particular in a peripheral position with respect to the water duct present in the hydraulic or connector unit itself, with the aforesaid volume that is connected in fluid communication with the gap between the inner pipe and the outer pipe of the device. The operating principle of such a leakage sensor is very simple: in the presence of an electrically conductive fluid—as is typically mains water—between the two electrodes, there is obtained an electrical conduction between the electrodes themselves, and the circuit arrangement of the safety device, to which the electrodes are connected, can establish, from this electrical conduction, the presence of leakage fluid within the detection volume.

In various preferential embodiments, the hydraulic control device according to the invention comprises both of the aforesaid sensors, i.e., both the aforesaid flow sensor and the aforesaid leakage sensor. Very advantageously, provided in these embodiments are first electrodes for the flow sensor, in particular for detecting the potential difference, and second electrodes for the leakage sensor, in particular for detecting the presence of water, which are carried by one and the same support, for example a planar support. This support has a first portion that carries the first electrodes, which extends within the duct for the water defined in a hydraulic or connector unit of the control device (such as the duct 30 defined by the connector body 16), and a second portion that carries the second electrodes, which extends on the outside of the duct for the water, within the aforesaid detection volume. Preferentially, the aforesaid first portion is a central or intermediate portion of the support, preferably a first substantially planar portion, whereas the aforesaid second portion is an end portion of the support, preferably a second substantially planar portion.

In various embodiments, in which the support includes both first electrodes for detecting the potential difference and second electrodes for detecting the presence of water, the support itself is inserted through at least one purposely provided passage defined in the wall of the water duct, at the at least one passage there being provided suitable sealing means, such as a gasket or a sealant material applied locally. Preferably, the aforesaid passage for the support has a shape substantially complementary to the cross section of the support (in the case of a substantially planar support, the aforesaid passage will hence preferably have a substantially rectangular or oblong shape).

In various embodiments, in the case of use of an electromagnetic-induction flow sensor, there may be provided also an arrangement or a sensor for measuring the intensity of the magnetic field generated by the electromagnetic (or permanent-magnet) arrangement, preferably in a position substantially corresponding to, or in the proximity of, the electrodes for measurement of the potential difference. This measurement arrangement may comprises a coil or a winding on the support (for example, in the form of spiral tracks etched or deposited on the support, or possibly in the form of a coil obtained with wire and mounted on the support), in such a way that, in the assembled condition of the device, also the coil or winding will come to be immersed in the magnetic field generated by the electromagnetic arrangement.

Alternatively, the aforesaid arrangement or sensor for measuring the magnetic field could be of a Hall-effect type, for example, comprising an electronic chip mounted on a support, such as the support of the electrodes of the flow sensor. Such a Hall-effect sensor could advantageously be coated with a protective layer (such as a layer of the type designated hereinafter by $41_2$) and/or with a resin so that it can be located within the duct 30, or else could be mounted outside the duct 30, for example in a seat provided in the body 16.

The aforesaid measurement arrangement (or sensor) may be used, for instance, for detecting possible unforeseeable variations of the magnetic field, for example, caused by temperature.

In various embodiments, the support for the electrodes is a multilayer support.

Figure 8:
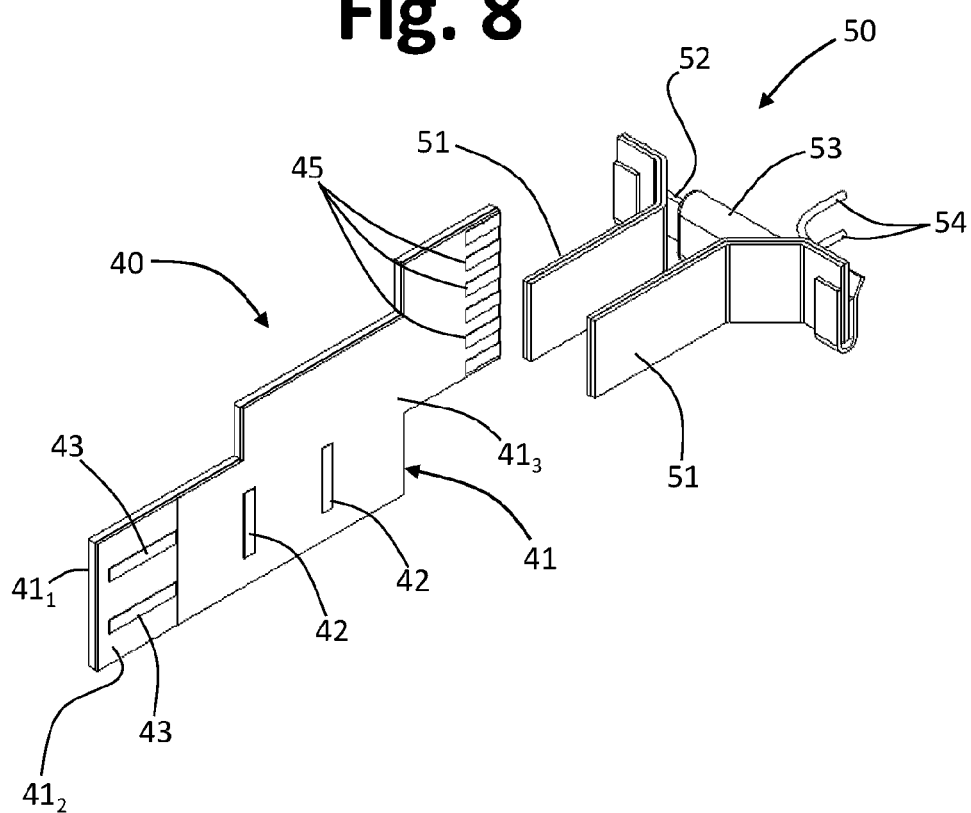
FIGS. 8 and 9 are, respectively, an exploded perspective view and an exploded top plan view, of a flow-sensing unit of a hydraulic control device according to possible embodiments of the invention.
Figure 9:
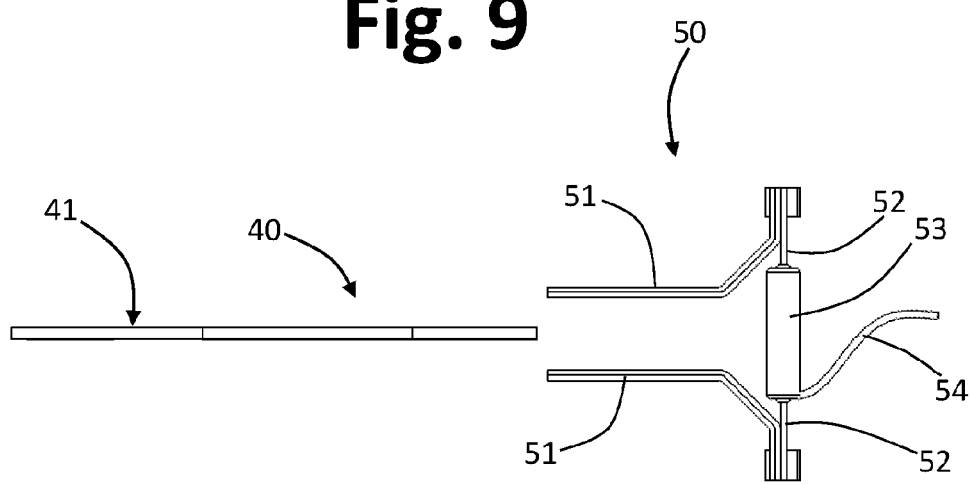

Schematically represented in FIGS. 8 and 9 are the parts of an electromagnetic-induction flow sensor that can be used in various embodiments of the invention, i.e., a detection arrangement 40 and an electromagnetic arrangement 50.

In the example, the detection arrangement 40 comprises a support 41, preferably planar and relatively rigid and straight, which may be, for example, made of plastic material, or ceramic material, or composite material (for example, FR4), or combinations of a number different materials. Present on the support 41 are signal electrodes 42 and 43, conductive tracks—some of which are designated by 44 in FIG. 10—and connection pads 45. The electrodes, the tracks, and the pads, which are also substantially planar, may, for example, be deposited, preferably using silk-screen or deposition techniques, or be obtained with etching techniques. As will be clarified hereinafter, the electrodes 42 are used for measuring the potential difference representing a value of flow-rate of the water in the duct 30, whereas the electrodes 43 are used for detecting any possible leakage water within the detection chamber 35.

In various embodiments, the support 41 may also be provided with the aforementioned arrangement or sensor for measuring the magnetic field induced by the electromagnetic arrangement 50. With reference to the case exemplified in FIGS. 8 and 9, a measurement coil is provided for this purpose, not visible in so far as it is defined within the support 41, here having a multilayer structure, which is in a position substantially corresponding to the electrodes 42. The aforesaid measurement coil (or an Hall-effect sensor which replaces it) may advantageously be used for providing a direct feedback of the intensity of the magnetic field generated by the arrangement 50 in the area of the electrodes 42, and thereby have available a signal useful for evaluating the presence of possible variations or problems of the electromagnetic system, such as variations due to tolerances of production and/or ageing and/or variations in temperature or faults following upon damage to the device.

In various embodiments, the electromagnetic arrangement 50 has a generally U-shaped configuration, or a configuration distinguished by the presence of two poles or yokes arranged substantially parallel or set alongside one another, between which the magnetic field previously mentioned is generated. In the case exemplified in FIGS. 8 and 9, the arrangement 50 comprises two yokes or poles 51 made of ferromagnetic material, which are generally parallel and are connected together by means of a third yoke 52, made of ferromagnetic material, arranged or wound on which is an electrical coil 53, with corresponding supply conductors 54. The yoke 52 may advantageously be made of materials with high magnetic remanence (semi-hard materials).

Figure 10:
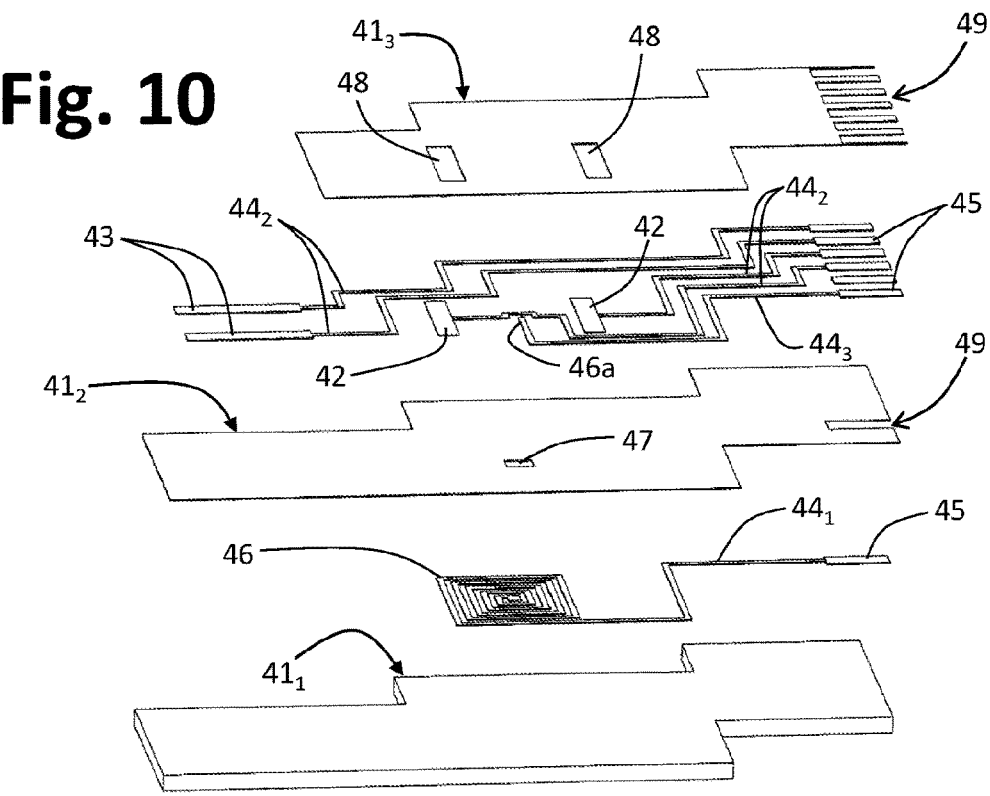
FIG. 10 is a schematic exploded view of a support belonging to a flow-sensing unit of a hydraulic control device according to possible embodiments of the invention.

With reference also to FIG. 10, in various embodiments, the support 41 may present a plurality of layers stacked on top of one another. In various embodiments, a base layer $41_1$ is provided made of an electrically insulating material, such as a plastic material (for example, polycarbonate), or else a ceramic material, or else a composite material (for example, FR4).

In various embodiments, defined on the base layer $41_1$ is at least one first conductive track $44_k$, which forms the aforementioned coil for measurement of the magnetic field, designated by 46, in particular a first conductive track $44_1$ wound in a spiral. The base layer $41_1$ is coated with an intermediate layer $41_2$, made of electrically insulating material, which protects and insulates the first track $44_1$ and is provided with a through opening 47 at the distal end of the path $44_1$ itself, which is substantially at the centre of the coil 46.

On the layer $41_2$ a second pattern with a number of conductive tracks, designated by $44_2$ and $44_3$, is defined. The tracks $44_2$ define at the respective distal ends the electrodes 42 and, when envisaged, the electrodes 43, which are located, respectively, in a central region and an end region of the layer $41_2$. The distal end of the track $44_3$ defines a contact 46a at the opening 47 of the intermediate insulating layer $41_2$, for electrical connection with the centre of the underlying coil 46 (i.e., the distal end of the corresponding track $44_1$). In this way, at the pads 45 of the track $44_1$ and $44_3$ a potential difference can be detected that is proportional to the intensity of the magnetic field generated by the electromagnetic arrangement 50.

The intermediate layer $41_2$ is coated with a further layer of electrically insulating material $41_3$, which protects and insulates all the underlying conductive tracks, leaving exposed only the electrodes 42 that are to be immersed in the water in order to measure the electrical potential proportional to the flow-rate, and the electrodes 43 for detecting the presence of water, that are to be set in electrical conduction in the presence of any possible leakage water in the chamber 35. In the example shown, the layer $41_3$ is provided with openings 48 for enabling the electrodes 42 to be left exposed, and has a smaller length than the layer $41_2$ so as to leave the electrodes 43 exposed. It is obviously also possible to provide layers $41_2$ and $41_3$ of the same length by providing in the latter passages so as to leave also the electrodes 43 exposed.

The various conductive tracks define, at the respective proximal ends, the connection pads 45, which are located at one edge of the layers $41_1$ and $41_2$, respectively. In order to leave the pads 45 exposed, the layers $41_2$ and $41_3$ define respective passages 49.

In the example, the tracks $44_2$ that define the electrodes 42 are present on just one major side of the base layer $41_1$. It is on the other hand possible to provide similar tracks—and hence similar electrodes 42 and a layer $41_3$—also on the opposite major side of the base layer $41_1$, for example in order to move some tracks onto this side or double the sensitive surface of the electrodes for measuring the potential difference representing the value of flow-rate of the water.

The conductive tracks provided on the support 41 may be defined via silk-screen printing technique or some other deposition technique, using, for example, inks with a base of coal or graphite or metals.

In various preferred embodiments, the duct for the liquid defined in one of the hydraulic or connector units of the device according to the invention has a detection region, where the flow sensor is installed, and in this detection region the section of passage of the duct varies upstream and downstream of the position of the electrodes for measuring the potential difference.

Figure 14:
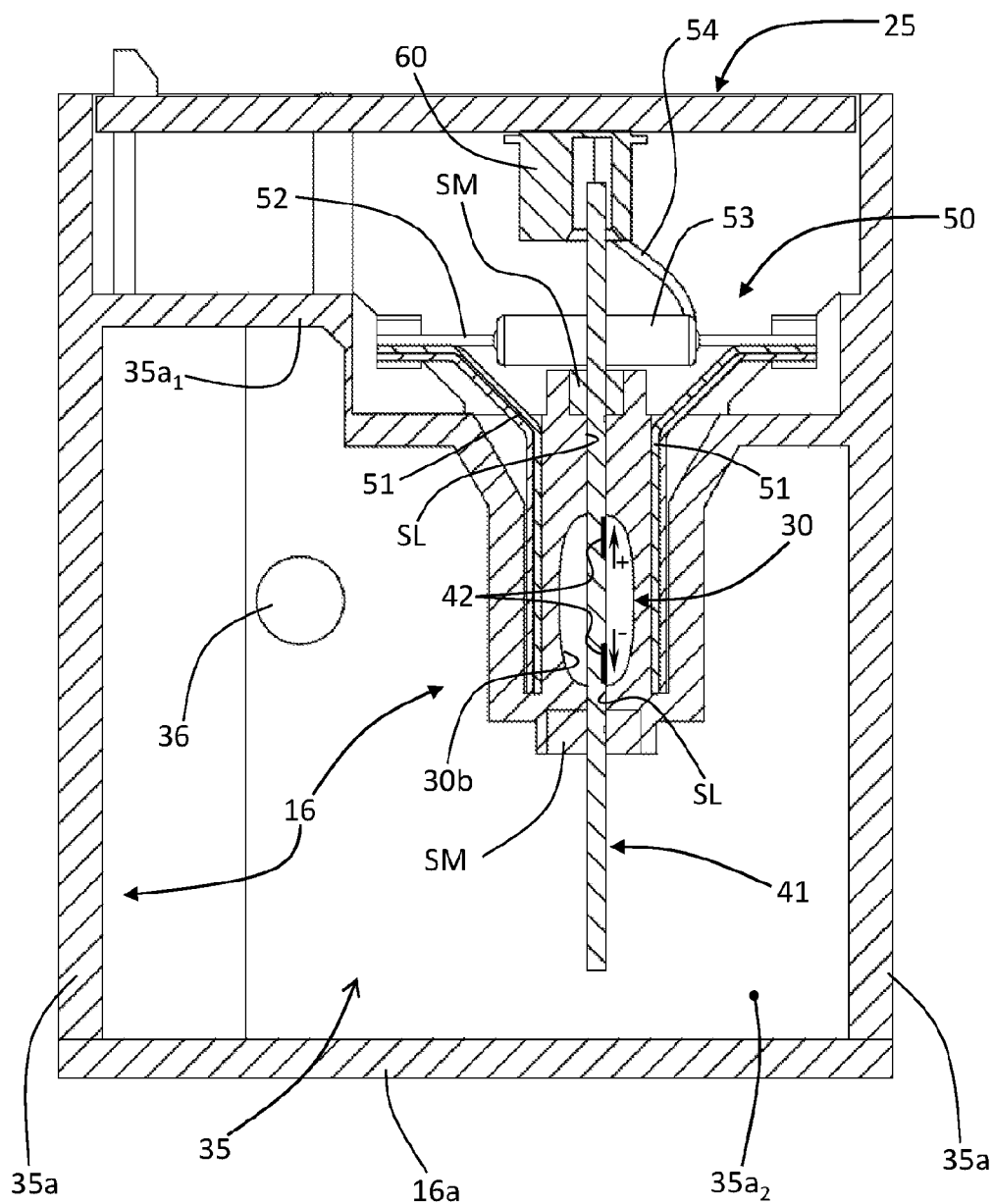
FIG. 14 is a partial and schematic cross-sectional view according to the line XIV-XIV of FIG. 13.

With reference to FIGS. 6 and 7, in various embodiments, the hydraulic or connector body on which the flow sensor is installed—here the body 16—has, on its tubular wall that defines the duct 30, two opposite through openings, designated by SL in FIGS. 6 and 14, for example in the form of substantially rectangular or oblong slits, or slits having a shape substantially complementary to the section of the support. The openings SL may, however, have some other shape designed for the purpose, in particular a shape designed to enable at least part of the support 41 and/or the corresponding electrodes 42 to be arranged so as to come into contact with the liquid, preferably in a position such as to be lapped by the flow of the liquid. The openings SL are defined in the aforesaid detection region of the duct 30.

In various embodiments, the support 41 is inserted in a transverse direction through the openings SL, with its major faces substantially parallel to the direction of the flow of the water. The support 41 may be inserted or positioned in such a way that its central region, in which the electrodes 42 are located, is within the duct 30, or is in any case in a position such that it can be lapped by the liquid, and its distal end region, where the electrodes 43 are located, projects into the chamber 35. Preferably, provided at the through openings SL are means SM designed to guarantee fluid tightness between the support 41 and the connector body 16, these means possibly comprising gaskets made of elastomeric material and/or a sealant material applied locally, for example a resin (of an epoxy, or acrylic, or mono-component, or bi-component type), or a polymer overmoulding.

In the case exemplified (see, in particular, FIG. 7), the aforesaid detection region comprises an area 30a for inlet of the water, where the section of passage 30, or at least a dimension thereof in width of the duct 30, decreases or narrows as far as an adjacent detection area 30b, where the electrodes 42 are located, followed by an adjacent area 30c for outlet of the water, where the section of passage or dimension of the duct 30 widens out again, preferably substantially up to its original section (i.e., the same section of passage as that immediately upstream of the inlet area 30a).

The section of passage in the detection area 30b, or at least a dimension thereof in width of the duct 30, is preferably smaller or narrower than at least one of the initial section of passage of the inlet area 30a and the final section of passage of the outlet area 30c, preferably both. The variation in the section of passage in the detection region 30a-30c, in particular a reduction of the section in the area 30b, presents the advantage that the rate of the flow of water increases in the detection area 30b at which the electrodes 42 are located and, consequently, in this area, an increased effect of separation of charge as a result of the magnetic field is obtained, which facilitates detection of the potential difference.

In various embodiments, the shape of the section of the duct 30 or of the detection area 30b of the detection region is substantially oblong, or substantially rectangular or elliptical, and the support 41 is inserted, or in any case set, in the aforesaid area 30b in a direction substantially parallel to the major dimension of the oblong section. With reference to the example illustrated in FIG. 14, the oblong section is at least approximately elliptical, but it could be at least approximately rectangular. The electrodes 42 may, in this way, be positioned as far as possible from one another, albeit within the restricted section of passage of the duct 30, in the detection area 30b. The distance between the electrodes 42 enables increase in the sensitivity of measurement of the potential difference. Given that the potential difference is substantially proportional to the transverse dimension of the section of passage of the water exposed to the magnetic field, an increase in the transverse dimension enables increase of the sensitivity of measurement.

In the proximal end region of the support 41 the connection pads 45 are located, substantially arranged as a male multipolar connector of an edge-connector type, which is coupled to a corresponding female multipolar connector 60 present on the face of the circuit support 25 that faces the duct 30, from which the conductors 9 for electrical connection to the dishwasher 1 extend. Also mounted on this face of the circuit support 25 are the various electrical and electronic components, some of which are designated by 61, for managing and processing the signals generated via the electrodes 42, 43 and the measurement coil 46-46a, as well as for supply of the coil 53 of the electromagnetic arrangement 50, via the corresponding conductors 54, which are likewise connected to the circuit support 25. Also connected to the circuit support 25 is the multipolar cable 21 for supply of the electric valve present in the unit 11 of the device 10, which, as has been said, preferably extends in part within the gap between the two pipes 13 and 14.

The circuit support 25 is fixed in position on the connector body 16, on the outside of the chamber 35, and hence in a position completely isolated both from the water that flows in the duct 30 and from the leakage water that may possibly reach the chamber 35.

The electromagnetic arrangement 50 is mounted in a position substantially corresponding to the support 41, on the outside of the duct 30, in particular in the detection area 30b of the duct. For this purpose, the connector body 16 may conveniently define mounting seats for the two yokes 51 (these seats are, for example, visible in FIGS. 13 and 14, where they are not designated by any reference number), preferably parallel and/or symmetrical to one another, very preferably the same as one another. The electromagnetic arrangement 50, and hence also the yoke 52 and the coil 53, may be entirely supported via the connector body 16, even though not excluded is also a mechanical connection—for example, of the coil 53 and of the yoke 52—also to the circuit support 25.

Figure 11:
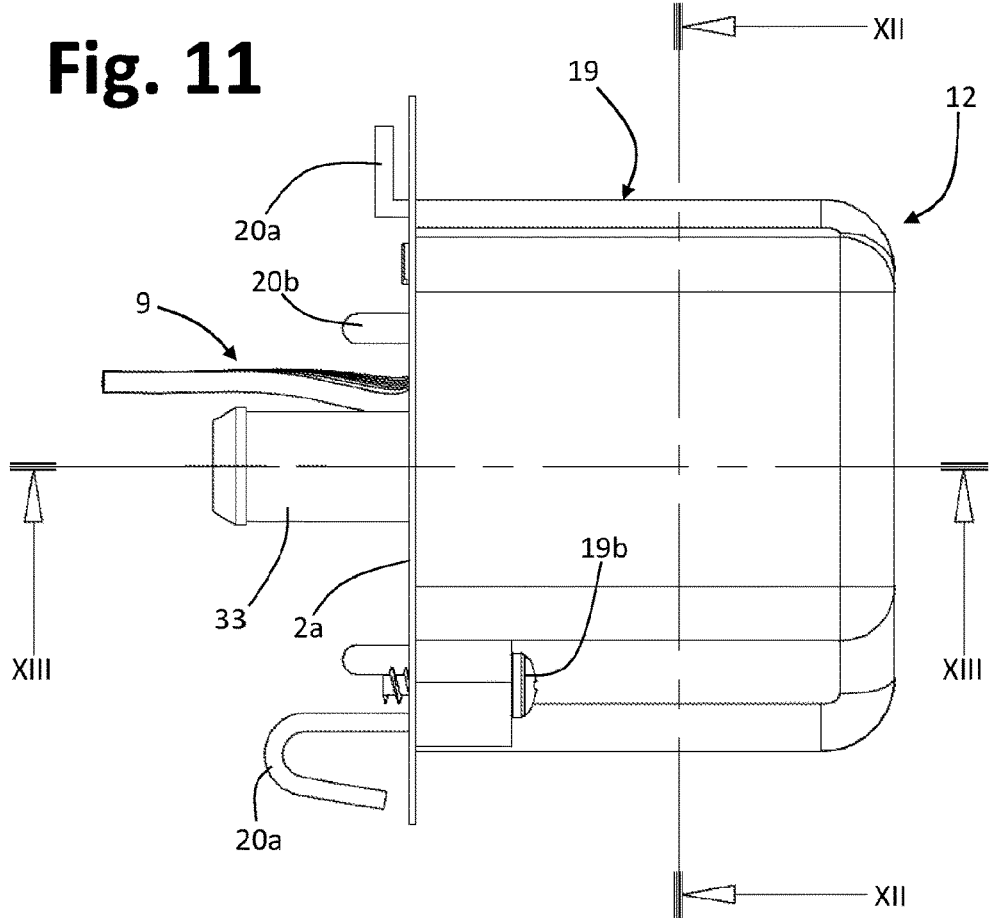
FIG. 11 is a schematic top plan view of a hydraulic unit of a hydraulic control device according to possible embodiments of the invention.
Figure 12:
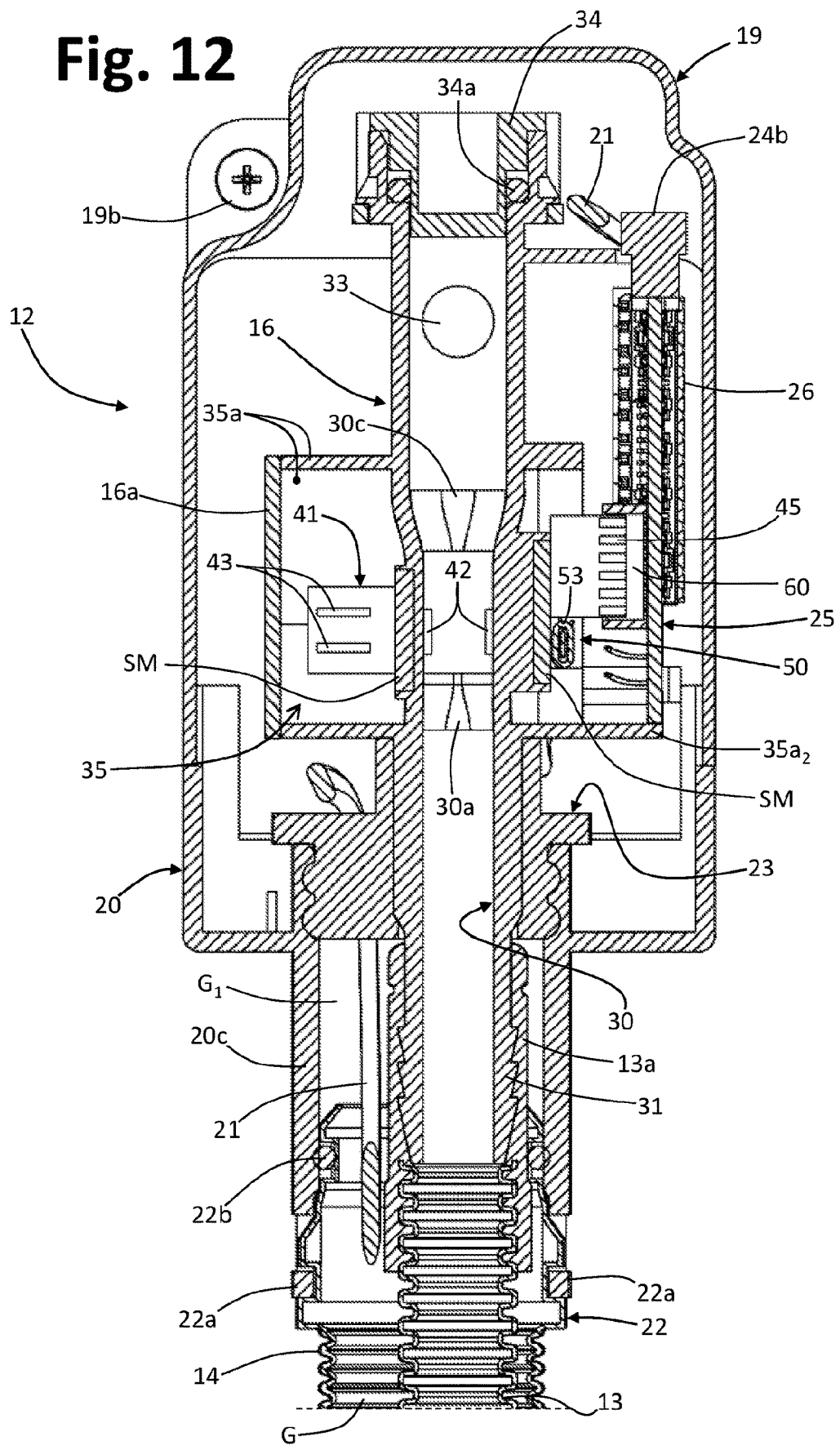
FIGS. 12 and 13 are schematic cross-sectional views according to the lines XII-XII and XIII-XIII of FIG. 11, respectively.
Figure 13:
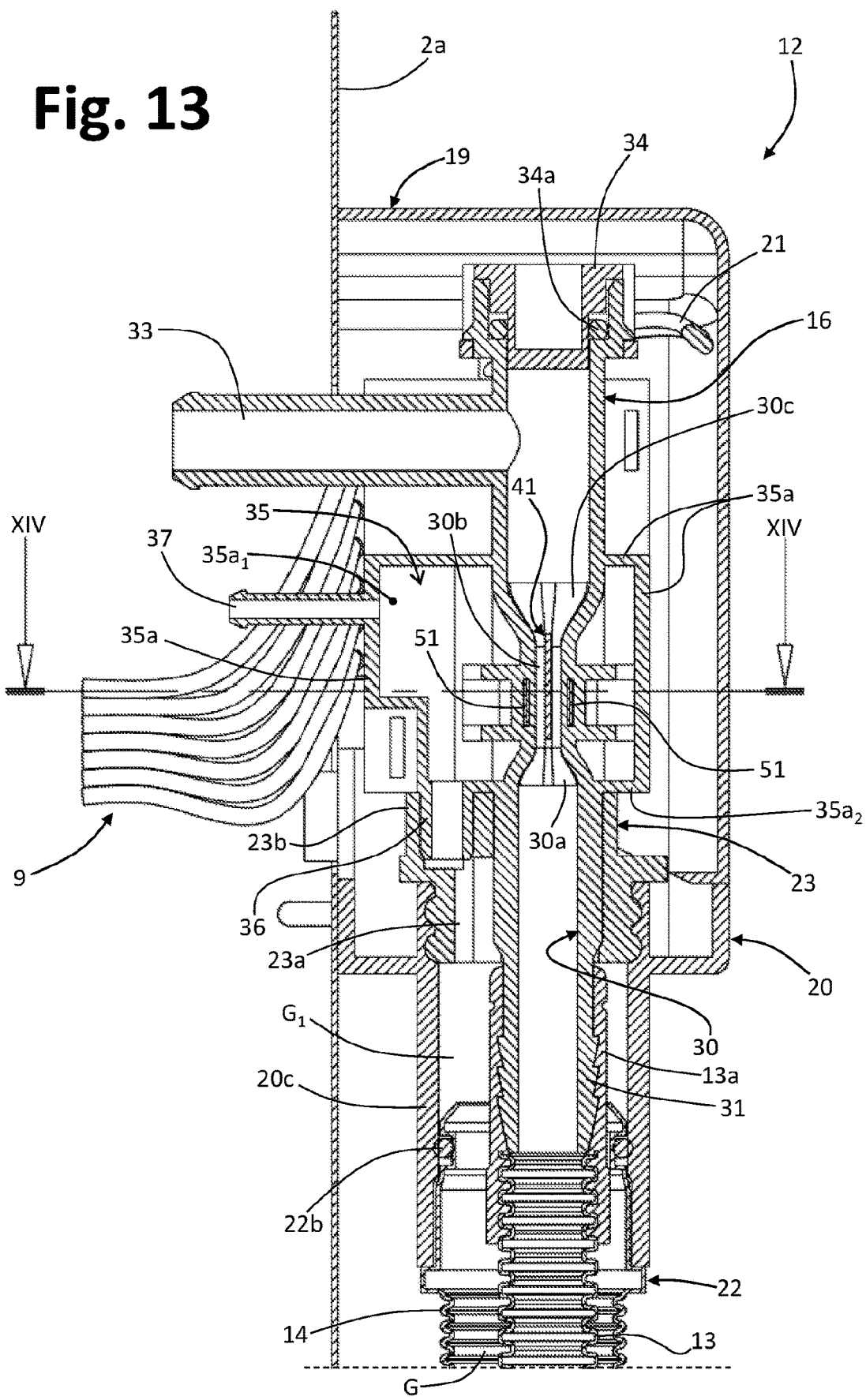

The connector unit 12 is shown in its assembled condition in FIGS. 11 and 13 and, limitedly to the parts of immediate interest for the purposes of an understanding of the invention, also in FIG. 14. From FIGS. 12 and 13 it is possible to appreciate the hollow structure of the terminal 22, which is preferably set at the distal end of the outer pipe 14, as well as how, between the inner pipe 13 and the outer pipe 14, the aforementioned gap is defined, here of a substantially annular shape, designated by G. From the above figures, it may also be noted how, between the inner pipe 13, preferably provided with a corresponding end sleeve 13a, and the portion 20a of the casing part 20, preferably having a cylindrical or tubular shape, a further substantially annular gap is defined, designated by $G_1$, which, thanks to the hollow structure of the terminal 22, is designed to provide a sort of "prolongation" of the gap G between the pipes 13 and 14.

Once again from FIGS. 12 and 13, it may be noted how, in various embodiments, the gasket 23 is arranged so as to close the cylindrical portion 20a of the casing part 20. However, as clearly emerges from FIG. 13, defined in the gasket 23 are two passages 23a, 23b substantially axial and in fluid communication with one another, where the bottom passage 23a opens at the gap $G_1$ and where coupled in the upper passage 23b is the inlet attachment 36 of the detection chamber 35.

From FIGS. 13 and 14 there may be noted a possible arrangement of the yokes 51, set parallel to one another, with the detection area 30b set in between, in order to direct through the latter the magnetic field used for the purposes of flow-rate detection.

Possible operation of the device according to the invention is described in what follows.

When the dishwasher 1 in the off condition, the corresponding control system does not supply the electric valve present in the connector unit 11 of the device 10. This valve hence remains in the condition where it closes the duct inside the unit 11, thereby preventing inlet of water into machine.

Figure 14A:
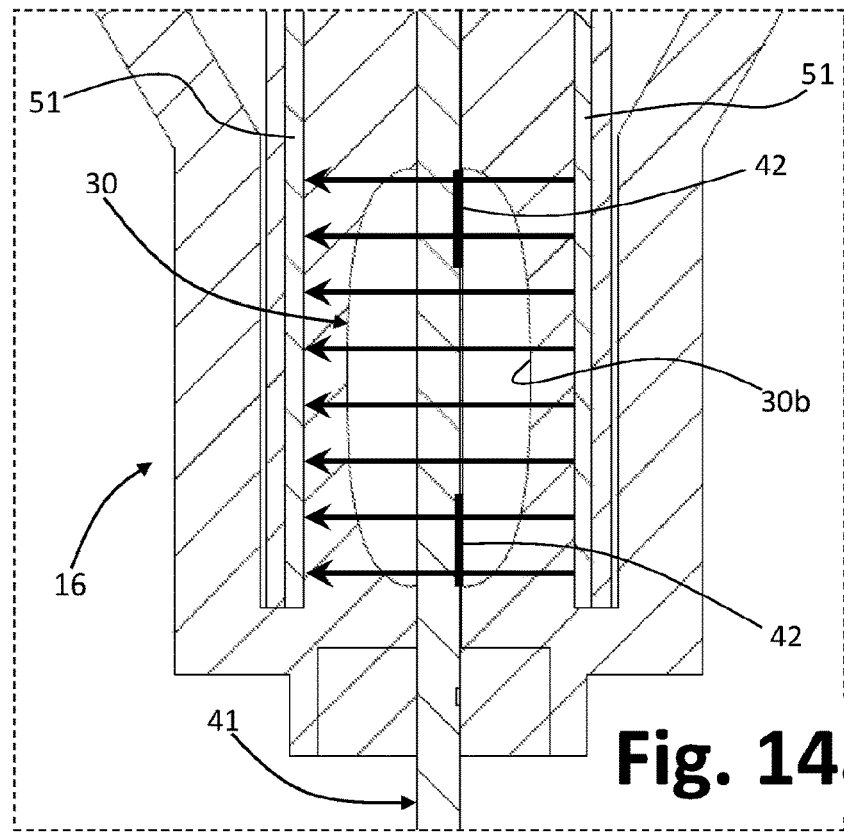
FIGS. 14a and 14b are details of FIG. 14, aimed at illustrating schematically the operating principle of a flow sensor that can be used in a hydraulic control device according to the invention.

Following upon start of a washing cycle, when loading of water into the machine becomes necessary, the control system of the dishwasher 1 enables opening of the aforesaid electric valve by supplying it electrically. The necessary supply voltage is supplied by the control system of the dishwasher to the circuit support 25 of the connector unit 12 via the wiring 9, and from the circuit support 12 the voltage is transferred to the electric valve of the unit 11 via the cable 21. Via the conductors 54 the circuit support 25 supplies also the coil 53 of the electromagnetic arrangement 50 of the flow sensor, thus creating a magnetic field in the yokes 51 that is enclosed through the detection area 30b of the duct 30, thereby traversing the flow of water. This magnetic field is schematically represented by the arrows transverse to the duct 30, i.e., to its detection area 30, in the detail of FIG. 14a.

Following upon opening of the electric valve, the water coming from the water mains flows into the duct inside the unit 11, passes through the inner pipe 13, and reaches the duct 30 of the connector unit 12. The flow of water then passes through the detection region 30a-30c of the duct 30 of the unit 12, and then into the outlet attachment 33 and, via the pipe 7 (FIG. 1), reaches the wash tub of the dishwasher.

Figure 14B:
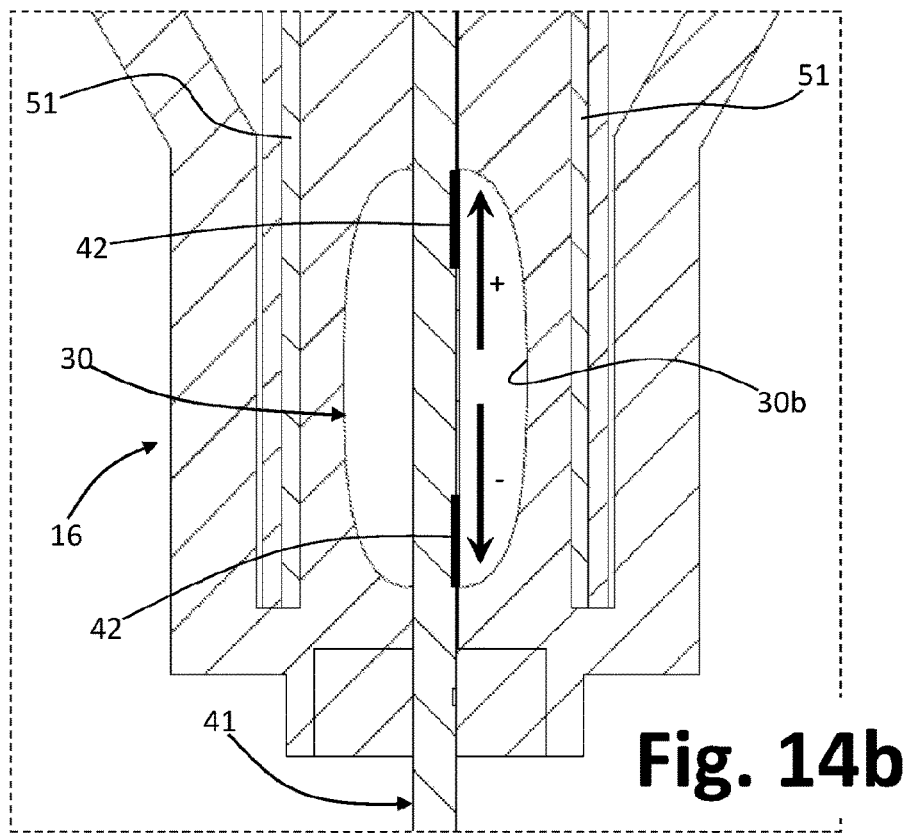

The presence of a magnetic field transverse to the flow of the water (FIG. 14a) causes the electrical charges present in the water (ions) to undergo an electromagnetic force that pushes them in opposite directions according to whether their charge is positive or negative. For example, with reference to the detail of FIG. 14b, all the positive charges will move according to the arrow "+" and all the negative charges will move according to the arrow "−". If the magnetic field is reversed, the electrical charges of the water will move in the opposite way.

Displacement of the electrical charges is present only if the flow-rate of water is other than zero, and the degree of displacement of the charges is proportional to the flow-rate; i.e., the higher the flow-rate of water, the higher the amount of electrical charges that will move. Displacement of the electrical charges at the sides of the detection area 30b will create a potential difference between the electrodes 42 present on the support 41, which is proportional to the flow-rate of the flow that passes through the magnetic field.

The signal across the electrodes 42 reaches the circuit support 20 (via the corresponding conductive tracks 44₂, pads 45, and connector 60—FIGS. 6, 7, and 10), where it is processed via the components 61. The electrical signal representing the value of flow-rate is then transmitted from the circuit support 25 to the control system of the dishwasher 1, via the wiring 9. It should be noted that the modalities of management, processing, and transmission of the data can be implemented according to any known technique. For instance, preferably, calculation of the value of flow-rate on the basis of the potential difference detected across the electrodes 42 and of the parameters known beforehand (dimension of the section of passage in the detection area 30a and intensity of the magnetic field generated by the arrangement 50) may be made by purposely provided components present on the circuit support 25 (for example, via a microcontroller) and sent to the control system of the dishwasher, for example a signal in the form of binary code or a signal variable in voltage and/or frequency. On the other hand, not excluded from the scope of the invention are solutions in which the value of the potential difference, appropriately amplified, is sent directly to the control system of the dishwasher, where the calculation of the flow-rate or flow is made on the basis of the aforesaid parameters known beforehand.

In any case, on the basis of the value of flow-rate, the control system of the dishwasher is able to measure the amount of water loaded into the tank. The control system of the dishwasher will interrupt supply of the electric valve of the connector unit 11 when the amount of water determined by the corresponding step of the washing programme has been loaded into the wash tub.

As has been mentioned, in various embodiments, also provided on the support 41 is a sensor of magnetic field, represented by the coil 46-46a (FIG. 10), which is substantially at the electrodes 42, and in any case within the magnetic field generated by the arrangement 50. Across the aforesaid coil, i.e., at the corresponding pads 45, it will hence be possible to detect a potential difference representing the intensity of the magnetic field produced by the yokes 51. This electrical value may, for example, be processed by the electrical/electronic components 61 present on the circuit support 25—preferably comprising an electronic controller and non-volatile-memory means—so as to have available information on the effective intensity of the magnetic field in the area of the electrodes 42 and thus have the possibility of evaluating the presence of possible problems or variations of the electromagnetic system.

Information of this type may be transmitted in the form of signal to the control system of the water-conducting electrical household appliance, for example for signalling possible faults of operation of the flow sensor. The information on the effective intensity of the magnetic field, as measured by the coil 46-46a can advantageously be used by the control logic (whether it is implemented on the circuit support 25 or in the control system of the dishwasher) for the purposes of calculation of the value of flow-rate, i.e., with a logic of an adaptive type, according to which the value representing the intensity of the magnetic field is a parameter that can be updated each time on the basis of the measurements made via the coil 46-46a.

As mentioned, in various preferred embodiments, at least the yoke 52 may be made of a semi-hard material, i.e., a material with high remanent magnetization. Materials of this type make it possible to maintain the magnetic field for a certain time even when supply of the coil 53 ceases, this being advantageous in view of a reduction in consumption of electrical energy, in particular when the device envisages an autonomous source of electrical energy (such as a battery 65 as described hereinafter). For example, in various embodiments, the pulses for supply of the coil 53 will occur at short time intervals, preferably shorter than one second (for example, 750 ms). Use of a semi-hard material enables application of such a pulse of the duration of some microseconds and guarantee the existence of the magnetic field for the rest of the time necessary. As may be appreciated, this enables energy saving, which is useful in the case of electrical supply with a battery or the like.

Possibly, if a semi-hard material is used for the yoke 52, the control electronics of the electromagnetic arrangement 50 can be prearranged for supplying the coil 53 so as to generate a first magnetic field and then interrupt supply, in any case guaranteeing existence of a certain magnetic field for a certain time interval following upon interruption of the supply. Preferably, but not necessarily, the control electronics may also be prearranged for measuring the magnetic field that remains in the aforesaid time interval (for example, via the aforementioned measurement coil or the aforementioned Hall-effect sensor) to establish the decay thereof with the coil 53 not supplied, for example in order to compensate the measurements of magnetic field and/or establish when to re-activate supply to the coil 53.

In the case where within the dishwasher there occurs a water leak due to a fault of an internal component thereof, the leakage water will reach the tray 5 (FIGS. 1-2) and will be detected by the sensor 6. The corresponding electrical signal (typically deriving from switching of a switch inside the sensor 6 or from the short-circuit between two electrodes inside the sensor 6) will reach the circuit support 25 via corresponding conductors of the wiring 9 and the corresponding information, once again in the form of electrical signal, and will be transmitted, via other conductors of the wiring 9, from the circuit implemented on the support 25 to the control system of the dishwasher, to issue appropriate warnings and/or implement corrective actions. For example, in the presence of such a signal/information, the control system will interrupt supply of the electric valve of the connector unit 11 (if the electric valve is at that moment supplied) or else will disable the possibility of supplying the electric valve until a purposely provided reset command is issued (typically carried out by staff providing technical assistance for the dishwasher).

A water leak may also occur within the safety device 10, for example on account of failure of the inner pipe 13. In this case, the leakage water is collected by the outer pipe 14, within the gap G. From the gap G the water passes into the gap $G_1$ (FIGS. 12-13) and then reaches the detection chamber 35, via the corresponding inlet attachment 36. The level of the water in the chamber 35 rises until it reaches the outlet attachment 37, and then the water flows through the pipe 8 (FIG. 2) into the collection tray 5 inside the dishwasher 1.

Once again prior to triggering of the sensor 6 set in the tray 5 (if this optional sensor 6 is provided), the leakage water within the chamber 35 sets the electrodes 43 in electrical conduction, thereby giving rise to an electrical signal that can be detected by the circuitry present on the circuit support 25. The signal representing the presence of water in the chamber 35 can be transmitted to the control system of the dishwasher 1 for issuing the appropriate warnings and/or implementing corrective actions, in a way similar to what has been described previously for the case of leakage inside the machine. It will be appreciated that, in the case of use of a device according to the invention, the control system of the dishwasher can be set in the condition where it recognizes in a fast and simple way whether the leakage water that is collected in the tray 5 is due to a fault or malfunctioning of an internal component thereof or else a fault or malfunctioning of the device 10. A consequent warning may be made available by the machine for washing, for example on the control panel of the dishwasher, preferably through a display or a warning-light system, or else via a radiofrequency or wireless signal to a portable electronic device, such as a mobile phone or a tablet, to indicate the point of the leakage (machine 1 or device 10), thereby simplifying identification of the fault by the technical staff. It is also possible to provide directly on the device 10 a purposely designed fault-warning system controlled by means of the aforesaid circuit of the support 25, for example, comprising a buzzer and/or an optical warning device, set on the unit 12 or also on the unit 11 (in which case electrical supply to the buzzer will be provided via the cable 21). A warning of this type could also be provided via transmission of signals in wireless mode (for example, via Bluetooth or Wi-Fi) to an external electronic device, such as a smart device. In this case, the circuit arrangement of the device according to the invention will be provided with a suitable wireless communication module, for example, a wireless transceiver.

According to various embodiments, the circuitry implemented on the circuit support 25 may also be prearranged so as to use the signal representing the presence of water in the chamber 35 in order to interrupt directly supply of the electric valve of the connector unit 1 (if it is currently open) or else to prevent subsequent electrical supply of the valve.

In various embodiments, the hydraulic control device according to the invention is provided with an autonomous source for electrical supply of its own circuit arrangement, for example via at least one battery, in particular for supplying at least the part of the circuit arrangement corresponding to the flow sensor (and to the possible leakage sensor). In this way, autonomous operation of the device may be enabled even in the absence of supply from the electric power mains or with the water-conducting household appliance turned off. The battery or batteries that provide the internal supply source of the device are preferably batteries of a rechargeable type, which can be recharged from the electric power mains directly or by way of the appliance.

Figure 15:
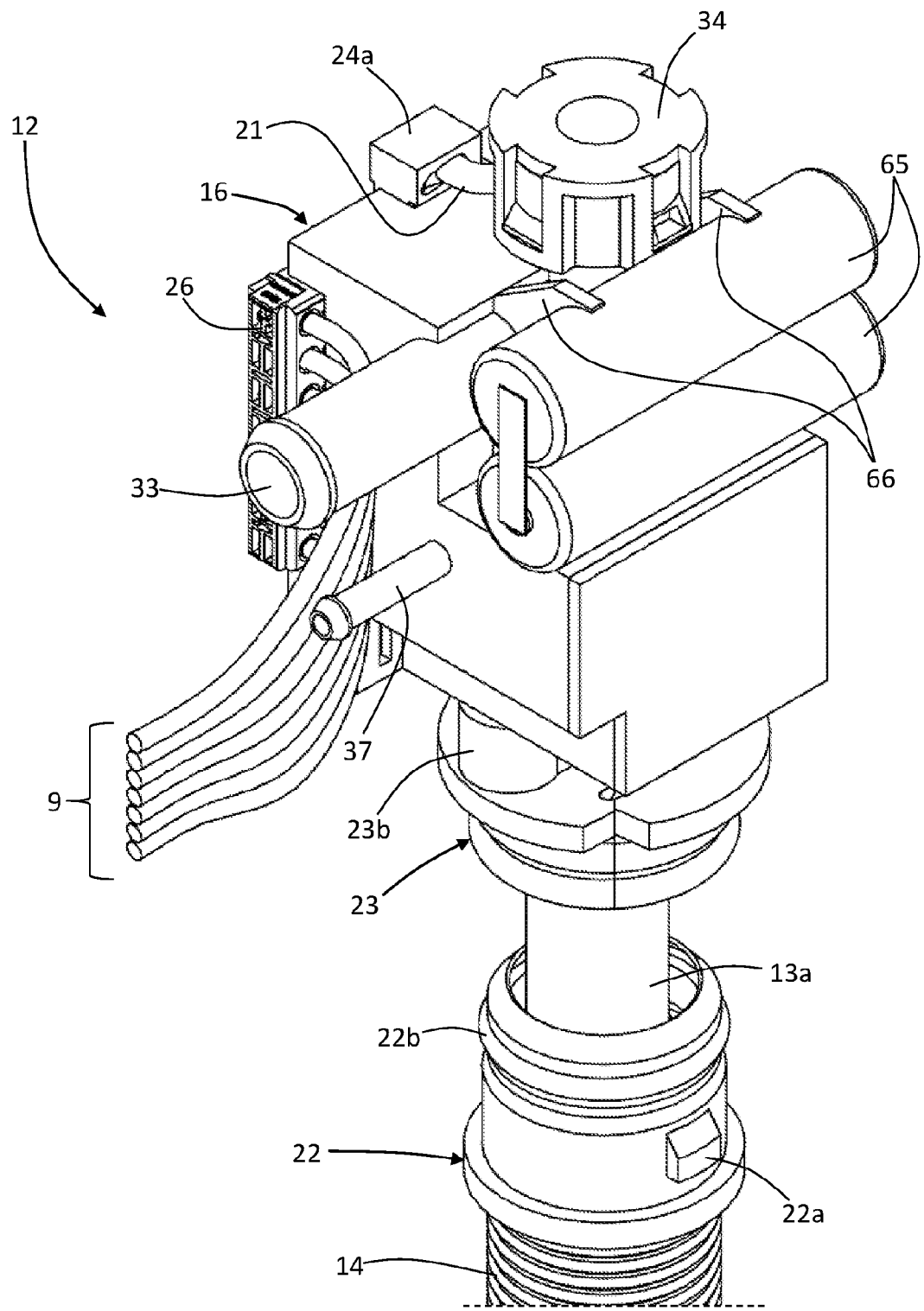
FIG. 15 is a view similar to that of FIG. 5, corresponding to a possible variant embodiment of the invention.

An embodiment of this type is schematically illustrated in FIG. 15. In this figure, designated by 65 are two batteries, which enable electrical supply of the electrical circuit proper to the device 10, even in the absence of voltage in the electrical wiring system where the dishwasher 1 is installed. In this way, even in the absence of electrical supply from the power mains (black-out), via the electrodes 43 it is possible to detect the presence of water within the detection chamber 35, and thereby identify a fault or malfunctioning of the device 10, in particular failure of the inner pipe. The connector body 16, or the unit 12, can be prearranged so as to define a purposely provided seat for the batteries. In the case exemplified, the connector body 16 defines engagement elements 66 for a pack of two batteries 65 in parallel to one another.

The electrical circuit inside the device 10 can be prearranged for being supplied from the power mains, through the dishwasher 1, as well as for detecting the possible absence of mains voltage, and in this case enable supply via the batteries 65. On the other hand, given that the consumption of electrical energy determined by the circuit arrangement inside the device 10 is very low (basically limited to the consumption necessary for generation of the magnetic field via the arrangement 50), the circuit arrangement could even always be supplied by means of its own internal supply source.

In various embodiments, the non-mechanical flow sensor provided in the device according to the invention can be used as a "virtual sensor" of water leaks. Assume, for example, that the sensor 40-50 detects an even minimal flow-rate of water through the duct 30 when the electric valve belonging to the connector unit 11 should be closed. In these conditions, detection of a flow-rate of water evidently indicates a problem at the aforesaid electric valve, which remains open or enables in any case inflow of water—albeit with minimal flow-rate—into the water-conducting household appliance, via the inner pipe 13, when this inflow is not programmed. In these circumstances, a suitable warning of leakage may be activated by the dishwasher 1 and/or by the device 10 itself, if it is equipped with a warning system of its own.

The same logic may be implemented when the sensor 40-50 is electrically supplied via the autonomous source 66 of the device 10. Assume that the dishwasher 1 is off and that the sensor 40-50 in any case detects an even minimal flow-rate. In these circumstances, the device 10 can activate, for example, an acoustic warning indicating leakage, via a warning system of its own, or else be prearranged for detecting subsequent switching-on of the dishwasher 1 and sending to the control system of the latter information or a signal corresponding to the operating fault encountered.

Also such a type of warning could be issued via transmission of signals in wireless mode, in a way similar to what has already been mentioned previously.

In various embodiments, the control electronics of the device, i.e., the circuit provided on the support 25, is prearranged for electrical connection to the electronic control system of the water-conducting household appliance, here represented by the dishwasher 1. For this purpose, as already mentioned, there may be used a suitable connector with a number of contacts, such as the connector previously designated by 26, which may, for example, be a connector of a rast-2.5 type. The number and type of contacts, i.e., of conductors 9, may be different according to the applications, for example, in view of the presence or absence of the sensor 6 of FIG. 2. In various embodiments, there could be present at least:

a) two contacts for electrical control of the valve arrangement of the unit 11 (which, as has been said, may comprise an electric solenoid valve), b) two contacts for electrical supply of the components present on the circuit support 25, including the detection arrangement 40 and the electromagnetic arrangement 50, c) one contact for reading the signals representing the measurement of flow-rate (i.e., the signals obtained via the non-mechanical flow sensor 40, 42, 50), d) one contact for reading the signals representing detection of water leakage (i.e., the signals obtained via the electrodes 43).

The contact referred to in point d) may be omitted in the case where the device 10 does not envisage the function of direct detection of leakage water (i.e., it does not envisage the electrodes 43), for example in case of the use on devices for dosage only, not equipped with the outer pipe.

In various preferential embodiments, at least one further contact is also provided, here defined as "programming contact", which can be used for receiving data, but on which there could also be transmitted data, preferably data stored or that can be stored in the circuit 25 of the device 10, for example, for writing and/or communication and/or modification of parameters useful or necessary for optimizing operation of the non-mechanical flow sensor.

Advantageously, during the production process, the presence of a multi-contact connector of the type referred to, such as the connector 26, can be exploited for the purposes of complete functional testing of the hydraulic control device. In this case, the aforesaid connector, instead of being connected to the electronic on board the dishwasher 1, will be connected to a specific testing equipment, prearranged for verifying proper operation of the device 10.

Preferably, the aforesaid testing equipment is prearranged for using all the contacts available a)-d) in order to test the corresponding functions. Advantageously, this equipment may also be prearranged for use of the aforesaid programming contact, for the purpose of writing or updating in a non-volatile memory present on the circuit support 25—for example, an EEPROM—one or more parameters designed to regulate operation of the circuit arrangement 40, 50, in particular of its part designed for measurement of flow-rate. Next, during normal operation of the device 10, i.e., after its installation, the programming contact might no longer be used (if not, possibly, following upon interventions of maintenance and/or technical assistance) or else could be used for other purposes, for example, for transmitting signals to the washing machine. The aforesaid parameter or parameters may be written by the testing equipment, via the programming contact, in purposely provided cells of the aforesaid non-volatile memory, according to common writing methodologies. In other embodiments, this programming could be made in wireless mode without the addition of physical contacts.

In various embodiments, the aforesaid parameter or parameters comprise at least one calibration parameter aimed at offsetting any possible production spread, due to the tolerances of the components used for obtaining the device 10 and/or of the processes used for its production.

A possible logic regarding the calibration parameter is described in what follows. During testing of the device 10, the value of flow-rate of water measured via the non-mechanical flow sensor 40, 42, 50 is checked against a value of flow-rate of water set and considered as real reference value. In the case where (on account of variability of the components and/or of the production process spread) the value measured by the flow sensor were not to correspond to the real reference value, it is possible to enter, in the control program of the controller of the device 10, a multiplying factor referred to as "calibration factor" so that the measurement with match correctly with the reference.

In practice, for example, the multiplying factor may be given by the ratio between the real reference value and the measured value (multiplying factor=real reference value/measured value). Then, in normal use of the device 10, the signal at output from the on-board electronics will be corrected by the controller by multiplying the value measured by the non-mechanical flow sensor by the multiplying factor (output signal=multiplying factor*·measured value).

In addition or as an alternative, the parameter or parameters that can be written in the aforesaid non-volatile memory may comprise one or more of the parameters listed below.

1) "Power-down time"—In order to reduce to a minimum electrical consumption of the non-mechanical flow sensor 40, 42, 50, the controller present in the circuit implemented on the support 25 may be prearranged for interrupting supply to the sensor itself between one measurement and the next. The time elapsing between two measurements may hence be adjustable, and for this purpose the parameter "power-down time" is envisaged. By increasing the value of the parameter "power-down time", the period of inactivity of the flow sensor is lengthened, thus reducing consumption (which is particularly advantageous when the electronics on board the device is supplied via the aforesaid autonomous source). In this way, also the time elapsing between one reading and the next of the output signal of the flow sensor, typically referred to as "sampling rate", is lengthened. The parameter "power-down time" hence enables regulation of the sampling rate (number of readings per unit time) consistently with the requirements of the end user.

2) "Filter activation"—The control electronics of the flow sensor can be prearranged for filtering the corresponding output signal in order to improve stability thereof. This is obtained via a common operation of a mathematical type, i.e., a mathematical processing of the values read, carried out prior to supply of the data at output from the device 10. The parameter "filter activation" enables activation or not of this operation. If this function is de-activated, the control electronics of the flow sensor supplies at output the numeric values as read, without any processing.

3) "Filter parameters"—The filtering logic is preferably of an adaptive type; i.e., it presents at least two operating modes according to whether the oscillations of the signal to be filtered are small or large. Large signal oscillations correspond to extensive variations of flow-rate. This situation typically occurs upon opening/closing of the flow of water through the device 10. In these cases, it may be preferable for the signal to follow rapidly the variation of flow-rate, without filtering (i.e., without any mathematical processing) that may slow down variation thereof. The filter compares the value read with the previous one. If the difference between these values is greater than a parameter "high delta-flow-rate", the filter does not carry out any mathematical calculation, but supplies the value as read. Conversely, small signal oscillations typically correspond to electrical or fluid-dynamic disturbance, which causes variation in the value of the signal even if the flow-rate has not in actual fact varied. In this case, it is advantageous to envisage a mathematical calculation that will filter the small variations and supply a more stable signal value. Also in this case, the filter compares the value read with the previous one. If the difference between these values is less than a parameter "low delta-flow-rate", then the filter carries out the mathematical calculations with the purpose of averaging the values read, and hence supplying a more stable value.

4) "Time constant"—The mathematical calculations referred to in points 2) and 3) are carried out taking into account the parameter "time constant", which defines how many successive readings of flow-rate must be taken into account to calculate the filtered value (according to average-calculation formulas that may be of different types). In practice, a high value of the parameter "time constant" supplies a value that is more stable but that follows any possible variations of flow-rate more slowly.

5) "Flow-rate cut value"—This parameter is aimed at indicating a value of flow-rate of water that is very close to zero. Any value of flow-rate read by the non-mechanical sensor that is less than the parameter "flow-rate cut value" is artificially forced to the zero numeric value. In this way, it is possible to neglect very small oscillations of the signal, which in practice do not give rise to a real flow-rate but in general are the result of electrical disturbance/noise.

6) "Zero transmission"—With this parameter (of a true/false type) it is defined whether the electronics on board the device 10 is to transmit or not the values of zero flow-rate. A preferable configuration from the standpoint of electrical consumption would be not to transmit the values of zero flow-rate. In this case, only in the presence of non-zero flow-rate would the electronics transmit an output signal, whereas in the absence of a detection of flow-rate it would not transmit any signal, with an advantage also for the control electronics of the dishwasher 1, which would hence not be required to manage zero, and hence insignificant, values.

Previously, reference has been made to integration of a non-mechanical flow sensor, preferably of an electromagnetic type, and/or of a sensor of presence of leakage water in a hydraulic unit or body that is located downstream of the pipe for water passage (such as the inner pipe) of the hydraulic control device, such as a connector unit that can be connected to a machine for washing. The same concepts apply, however, also to integration of one or both of the above sensors in the hydraulic unit or body that is upstream of the pipe 13, such as a connector unit that can be connected to a tap or to a water mains.

It will, in fact, emerge clearly to the person skilled in the art that various characteristics and functions described previously in relation to the connector unit 12 can be applied also to the connector unit 11.

Figure 18:
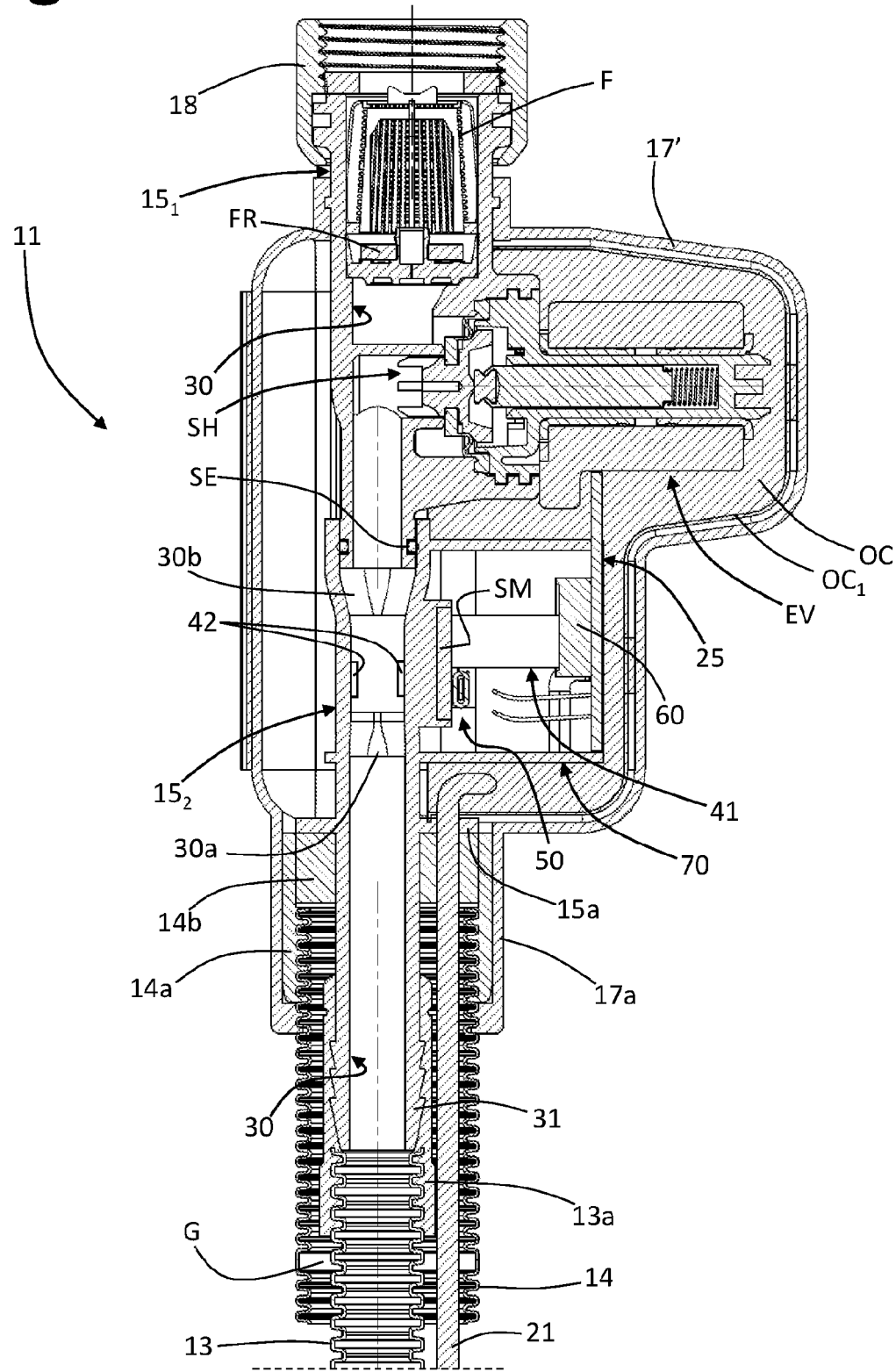
FIG. 18 is a schematic longitudinal sectional view of the hydraulic unit of FIG. 17.

For example, FIGS. 16-18 refer to the case of integration of a non-mechanical flow sensor, in particular an electromagnetic flow sensor, in a unit 11. In these figures, the same reference numbers as those of the previous figures are used to designate elements that are technically equivalent to the ones already described above.

In various embodiments, such as the one exemplified, the unit 11 has an outer casing made up of two half-shells 17' and 17", which encloses the corresponding connector body. As may be seen in particular in FIG. 18, in this case the connector body is preferably made up of two parts $15_1$ and $15_2$, mechanically and hydraulically coupled together, which each define a respective part of the duct 30 for the water inside the unit 12, possibly, however, comprising a number of parts or consisting of a single body. The two body parts $15_1$ and $15_2$ are made of electrically insulating material, for example a moulded thermoplastic material. The preferential formation of the hydraulic or connector body in two parts is also in this case dictated by the need to be able to obtain some profiles via moulding, and in particular the detection region 30a-30c with variable section of the duct 30, a volume for housing the components of the flow sensor, and the mounting seats for the electric valve, designated by EV, and for the corresponding open/close member, designated by SH, which is preferably of the type comprising a membrane. Valves of this type are in themselves known and widely used in hydraulic control performing dosing functions or performing anti-flooding safety functions. Preferably, provided in the coupling region between the two body parts $15_1$ and $15_2$, in particular in the area of coupling between the respective portions of the duct 30, is at least one sealing element, designated by SE, such as a gasket of an O-ring type. Mechanical coupling between the two body parts $15_1$ and $15_2$ in the area where the sealing element SE is preferably provided may be, for example, of the bayonet-coupling type or of the type using engagement elements or pins. Alternatively, the sealing element could be omitted in the case of gluing or welding between the two body parts $15_1$ and $15_2$, such as laser or hot-blade welding.

As may be seen, in various embodiments, to one and the same hydraulic or connector body there may be associated a first electromagnetic arrangement of a electric valve and a second electromagnetic arrangement of a flow sensor. Preferably, associated to a first body part—such as the part $15_1$—is the first electromagnetic arrangement, whereas associated to a second body part—such as the part $15_2$—is the second electromagnetic arrangement. In various embodiments, the open/close element of a electric valve is associated to a first body part, such as the part $15_1$, whereas the electrodes of a flow sensor are associated to a second body part, such as the part $15_2$, upstream or else downstream of the open/close element.

Preferably, the hydraulic or connector body, i.e., its part $15_2$, defines in this case a box-like volume or housing, designated by 70, which in some way is similar to the chamber 35 described previously, but in this case has the function of housing the components of the electromagnetic-induction flow sensor. Also in this case, the sensor comprises a support 41, preferably planar, and an electromagnetic arrangement 50 of the type described previously. The support 41 carries, however, only the electrodes 42 for detecting the potential difference, as well as the possible coil (46-46a) for detecting the intensity of the magnetic field. In this case, the circuit support 25 is mounted at one end of the housing 70.

In the case exemplified, provided upstream of the ring-nut 18 are a filter F and a flow regulator FR, which are both of a conception in itself known, and which in any case constitute optional components of the device 10.

On the opposite side with respect to the ring-nut 18, the casing 17'-17" preferably defines a tubular part 17a, generally cylindrical, within which there may be housed an elastomeric sleeve 14a, for example overmoulded on the proximal end of the outer pipe 14. This sleeve 14a may in turn be in part fitted on a closing gasket 14b made of elastomeric material, which surrounds a corresponding cylindrical portion of the body part 15$_2$, extending through which is a corresponding part of the duct 30 for the water, the gasket 14b preferably bearing upon a corresponding flange formation 15a (see also FIG. 17) defined by the body part 15$_2$ itself and having a fluid-tight passage for the cable 21.

The sleeve 14a and the gasket 14b are preferably enclosed in the portion 17a of the casing 17'-17" in a condition of at least partial elastic compression so as to ensure mechanical and fluid-tight way fixing of the outer pipe 14, with the gap G between the two pipes that is closed at the top, by means of the gasket 14b. The inner pipe 13 is coupled to an outlet attachment 31 of the hydraulic or connector body, i.e., of its part 15$_2$, by way of a sleeve 13a.

Departing from the circuit support 25 is the cable 21 necessary for supply of the circuit implemented on the support 25 itself, as well as for supply of the electromagnetic arrangement 50 and for carrying the control signals. In the case where the electromagnetic arrangement 50 is not supplied via batteries, the cable 21 preferably comprises at least five conductors, two of which for the solenoid of the electric valve EV and three for the flow sensor (supply+signal representing flow-rate).

In various embodiments, the hydraulic unit provided with the valve arrangement and the flow sensor has a casing made at least in part of a polymer or a resin or a thermoplastic material overmoulded on the corresponding hydraulic body. The aforesaid casing may be provided for enclosing or covering at least in part the electrodes of the flow sensor and the electromagnet of a solenoid valve and/or a magnetic yoke of a solenoid valve and at least one magnetic yoke of a flow sensor and/or a coil for actuation of a solenoid valve and a coil of a flow sensor.

In the case exemplified, provided on the connector body 15$_1$-15$_2$ and on the electric valve EV, as well as on a respective part of the cable 21, is a mass of polymer or resin OC, having electrical-insulation and hygroscopic functions (protection from water and humidity), which is confined in a corresponding shell OC$_1$ that is then enclosed in the casing 17'-17". Advantageously, the mass OC also functions as system for mechanical blocking between the two body parts 15$_1$ and 15$_2$.

Figure 21:
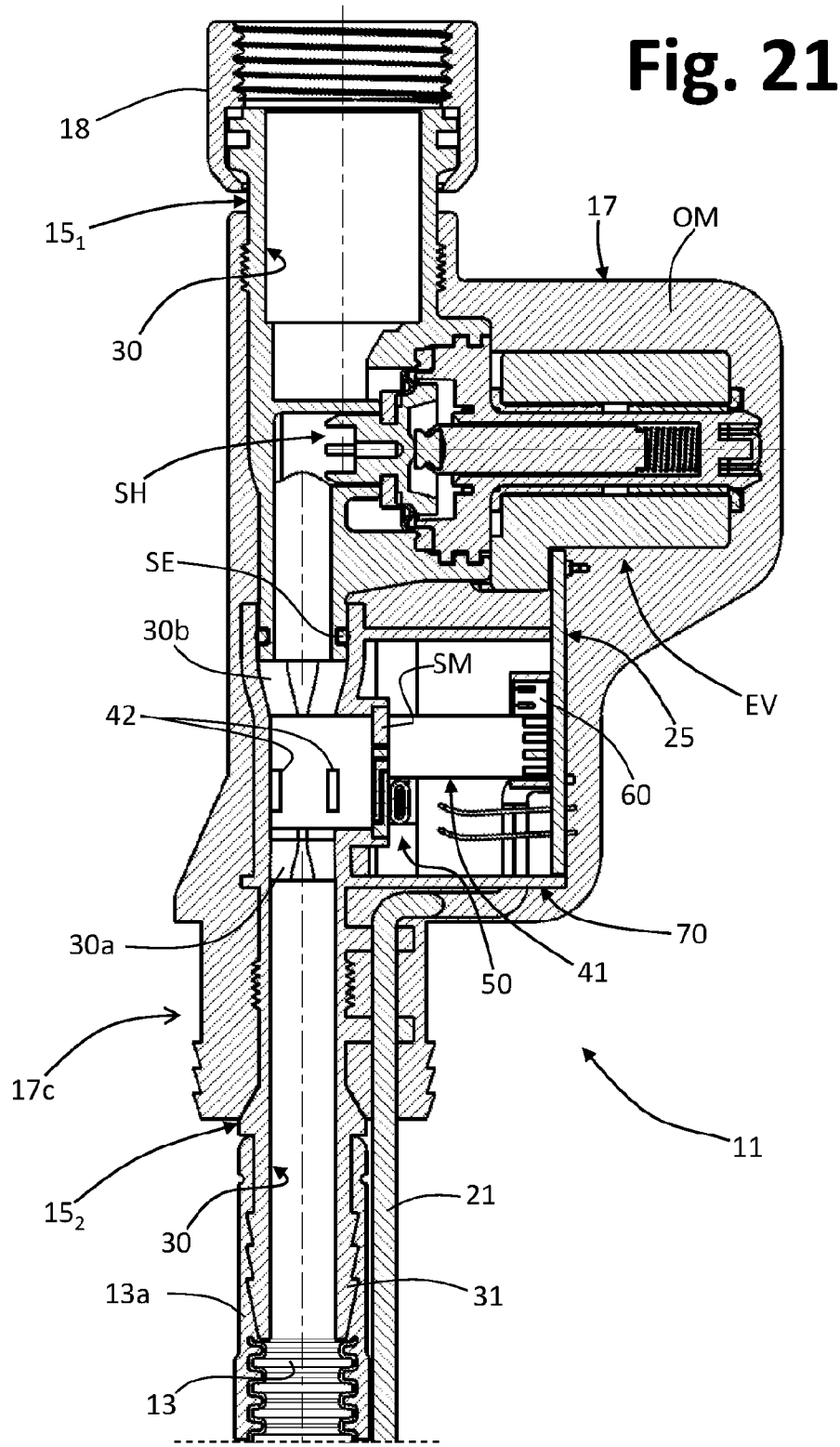
FIG. 21 is a schematic longitudinal sectional view of the hydraulic unit of FIG. 19.

As may be appreciated, operation of the flow sensor 40-50 of the device represented in FIGS. 16-18 is altogether similar to what has been described previously. FIGS. 19-21 refer to an embodiment altogether similar to that of FIGS. 16-18, but in which the outer casing 17 of the unit 11 is directly defined by a body OM of overmoulded material, in particular a polymer or a thermoplastic material, appropriately shaped for the purpose. From FIG. 21 it may be noted how in this case the body OM is overmoulded so as to surround the connector body 15$_1$-15$_2$ completely at least in an intermediate portion thereof comprised between the ring-nut 18 and the attachment 31 for the inner pipe 13. Advantageously, the overmoulded body OM functions also as system for mechanical blocking between the two body parts 15$_1$ and 15$_2$. Once again from FIG. 21 it may be noted how, advantageously, the overmoulded body OM may be shaped also for defining a positioning seat 17c for the sleeve 14a on the proximal end of the outer pipe 14. In this embodiment, the shell OC1 represented in the previous FIG. 18 is not necessary.

Operation of the flow sensor 40-50 of the device represented in FIGS. 19-21 is similar to the one described previously.

In the embodiments of FIGS. 16-18 and 19-21, the unit 11 is not provided with the sensor for detecting the presence of leakage water. It will be appreciated, however, that, with simple adaptations, also the operation of detection of leakage water, such as a leakage from the inner pipe, could be integrated in a connector unit 11, simply by:

- defining in the unit 11 (in particular, in its body part 15$_2$) a detection chamber functionally similar to the one previously designated by 35,
- setting the gap G between the pipes 13 and 14 in fluid communication with the aforesaid detection chamber and closing, instead, the gap G at its lower end, for example, with a gasket that has in any case a fluid-tight passage for the cable 21,
- rendering the support 41 and its mounting similar to that of FIGS. 1-15, i.e., equipping the support 41 with the electrodes 43 and inserting it through respective opposite openings provided in the detection region 30a-30c, in such a way that the portion of the support 41 that carries the electrodes 43 projects into the detection chamber, and
- implementing the circuitry necessary for the sensor for the detection of leakage water on the circuit support 25.

In this case, the leakage water will progressively fill the gap G between the two pipes 13 and 14, until it reaches the detection chamber, thereby shorting the electrodes 43, in a way similar to what has been described previously.

Possibly, a unit 11 could also be provided with an autonomous electrical supply source of its own, in a way similar to what has been previously described with reference to FIG. 15.

As mentioned previously, the flow sensor that equips a safety device according to the invention does not necessarily have to be an electromagnetic-induction sensor, it possibly being of some other non-mechanical type, in particular of the hot-wire or hot-film type.

Figure 22:
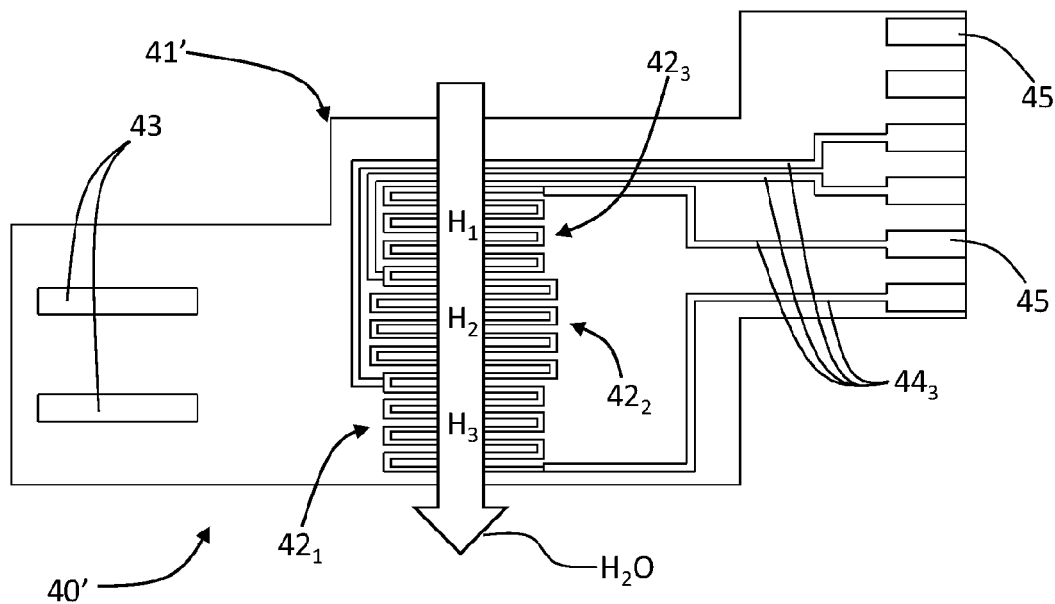
FIG. 22 is a schematic top plan view of a support belonging to a sensing unit of a safety device according to further possible embodiments of the invention.
Figure 23:
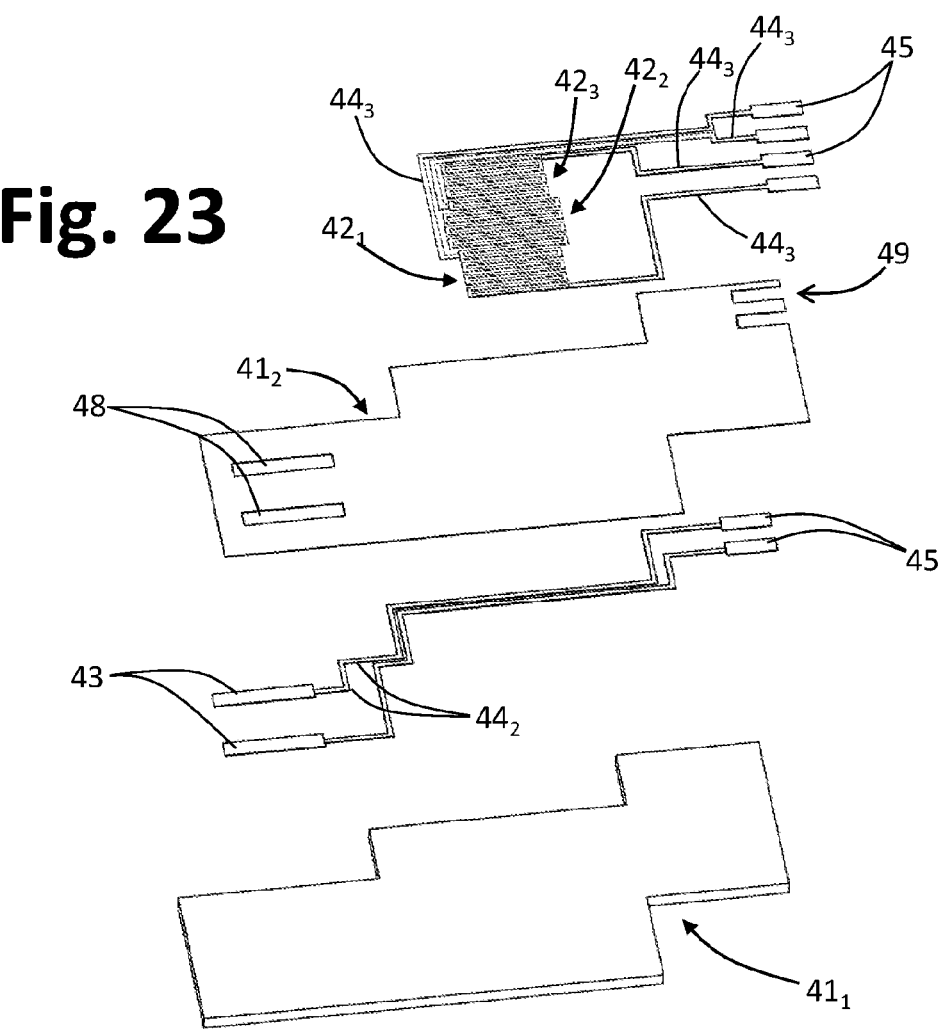
FIG. 23 is a schematic exploded view of the support of FIG. 22.

For example, FIGS. 22 and 23 illustrate a possible variant embodiment of a support that can be used in a hydraulic control device according to the invention, based upon the use of a hot-wire or hot-film flow sensor, designated as a whole by 40' in FIG. 22.

The support 41' of FIG. 22 has the electrodes 43 for detecting any possible leakage water, in a way similar to what has been described previously, as well as a plurality of resistors.

In various embodiments, such as the one exemplified, three resistors are provided, designated by 42$_1$, 42$_2$, and 42$_3$ The three resistors are preferably arranged substantially aligned to one another in the direction of height of the support 41', i.e., with reference to the mounted condition of the support 41, in the direction of the flow of water in the flow-rate-detection area (30b, see the previous figures). In FIG. 22, the flow of water is indicated schematically by the arrow H$_2$O. As may be noted in particular from FIG. 23, the electrodes 43 are defined by respective conductive tracks 44$_2$, the proximal ends of which provide the connection pads 45. Also the resistors 42$_1$, 42$_2$ and 42$_3$ are defined by respective conductive tracks 44$_3$ isolated from the liquid (for example, via a further upper layer of electrically insulating material, not represented), the proximal ends of which provide the respective connection pads 45.

The central resistor 42$_2$ provides the hot wire or hot film, in so far as it is prearranged so as to produce heat when supplied by electric current. The lateral or end resistors 42$_1$, and $42_3$ modify, instead, their value of ohmic resistance on the basis of the temperature detected.

Assume that the support is mounted in the detection region $30a$-$30c$ of a duct 30 as illustrated in previous figures (even though such a region with variable section of passage is not strictly necessary) and hence with the support inserted in a transverse direction in the detection area $30b$, with the intermediate portion of the support 41' which carries the resistors $42_1$, $42_2$, and $42_3$ that is hence within the duct for the water, and with the distal end portion of the support 41' which carries the electrodes 43 that extends within the detection chamber 35 described previously. The proximal end portion of the support 41', i.e., the corresponding connection pads 45, is/are coupled to a corresponding connector 60 carried by one and the same circuit support 25.

In the presence of the flow of water $H_2O$ in the duct 30, the resistors $42_1$ and $42_3$ are heated in an asymmetrical way by the heat produced by the resistor $42_2$; i.e., the temperature in the area designated by $H_1$ in FIG. 22 will be lower than the temperature in the area designated by $H_3$, the areas $H_1$ and $H_3$ being, respectively, upstream and downstream of the area $H_2$ in which heating by the resistor $42_2$ is induced. This difference in temperature, measured as difference of ohmic resistance of the resistors $42_1$ and $42_3$ will be proportional to the flow-rate of water. Conversely, in the case of zero flow-rate, the difference in temperature, i.e., in ohmic resistance of the resistors $42_1$ and $42_3$, is assumed as being zero. It should be noted that in FIG. 22 the direction of the flow is from the top down, for example for applications of the same type as those of FIG. 16-18 or 19-21. In the case of applications of the same type as the ones of FIGS. 6-7 and 12-13, the direction of the flow will be from the bottom up, and operation of the resistors $42_1$ and $42_3$ and of the corresponding areas $H_1$ and $H_3$ will be reversed with respect to the one just described.

Of course, in the case of a hot-wire or hot-film flow sensor, the electromagnetic arrangement 50 of the previous figures is not necessary, and the control logic of the system will be implemented for deriving the value of flow-rate on the basis of the ohmic difference detected.

As may be noted from FIG. 23, also the support 41' can have a multilayer structure, with a base layer $41_1$ defined on which are the conductive tracks $44_2$ that define the electrodes 43. This base layer $41_1$, and the corresponding tracks $44_2$ are covered by a layer of electrically insulating material $41_2$, provided with through openings 48 in order to leave the electrodes 43 exposed. Provided on the layer $41_2$ are the tracks $44_3$ that define the resistors $42_1$, $42_2$ and $42_3$.

Also in this embodiment, the base layer $41_1$ may be made of plastic material (for example, polycarbonate), or else a ceramic material, or else a composite material (for example, FR4). The conductive tracks may be defined via the silk-screen printing technique or some other deposition technique, using, for example, inks with a base of coal or graphite for the paths $44_2$, and a resistive material, such as silk-screen pastes with a base of coal or graphite, for the paths $44_3$.

It will be appreciated that the support 41' can be mounted in a transverse direction with respect to the duct 30 in a way similar to what has been described in relation to the support 41. It will moreover be appreciated that, for applications similar to the ones described with reference to FIGS. 16-18 and 19-21 or for use on devices for volumetric measurement alone, the support 41' could be without the electrodes 43.

The hot-wire or hot-film flow-rate sensor used in the device according to the invention could have a different structure, according to a technique in itself known.

What has been described previously in relation to possible modalities of electrical connection, testing, and calibration of the electronics on board the hydraulic control device forming the subject of the invention may be applied also in the case of devices as the ones represented in FIGS. 16-18, 19-21, and 22-23.

The hydraulic control device according to the invention does not necessarily have to be configured as an anti-flooding safety device (i.e., comprising an inner pipe and an outer pipe), being it able to be a device for the sole management or control of a fluid in the face of a flow measurement, or dosage or control of the supply of a liquid, hereinafter briefly referred to also as "volumetric control".

Possible embodiments of this type are shown in FIGS. 24-29, which use the same reference numerals as the preceding figures, to indicate elements being equal or technically equivalent to those already described above.

Figure 24:
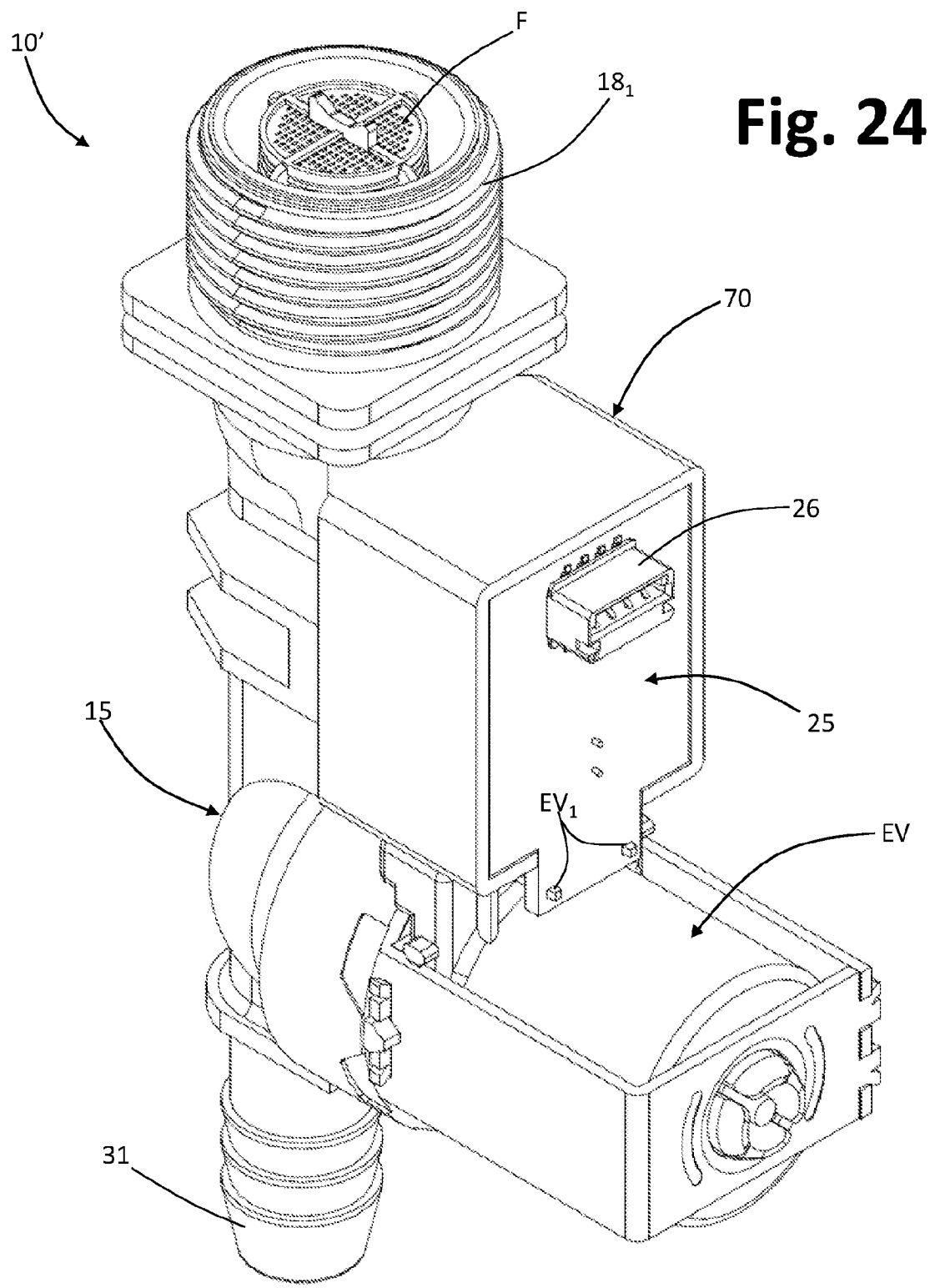
FIGS. 24, 25 and 26 are partial and schematic views, respectively a perspective view, a sectional view and an exploded view, of a hydraulic body of a hydraulic control device according to further possible embodiments of the invention.
Figure 25:
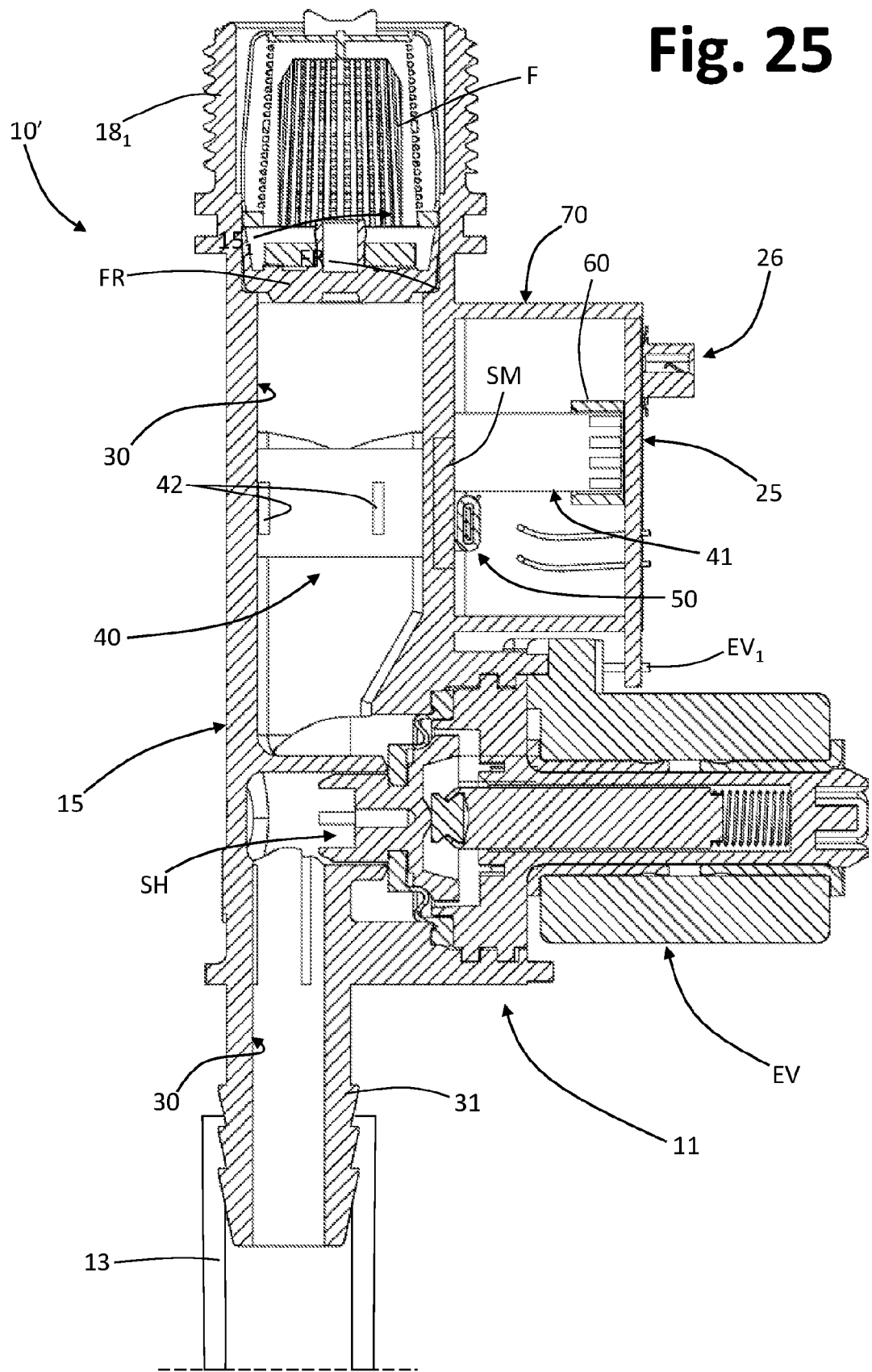
Figure 26:
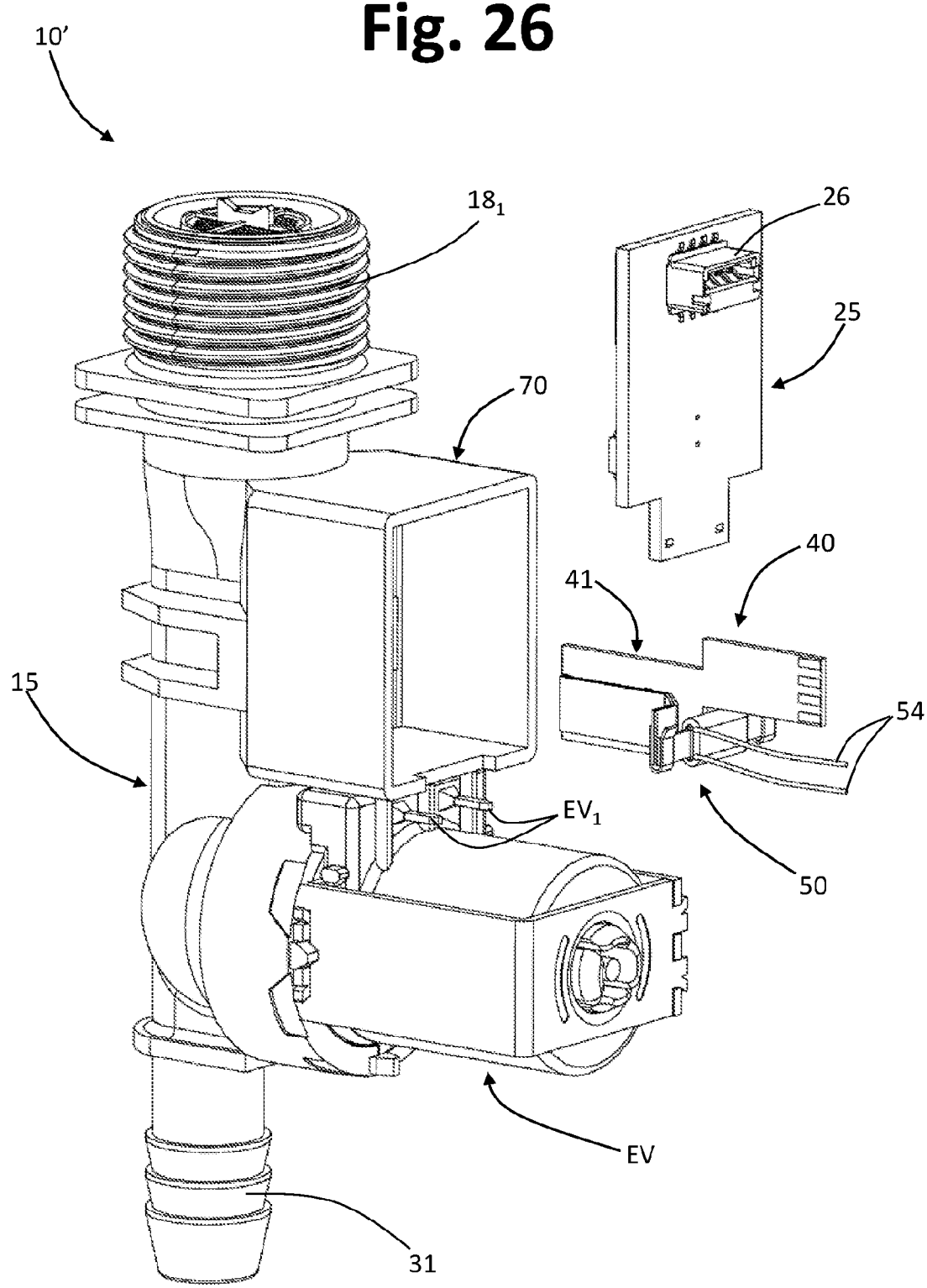
Figure 27:
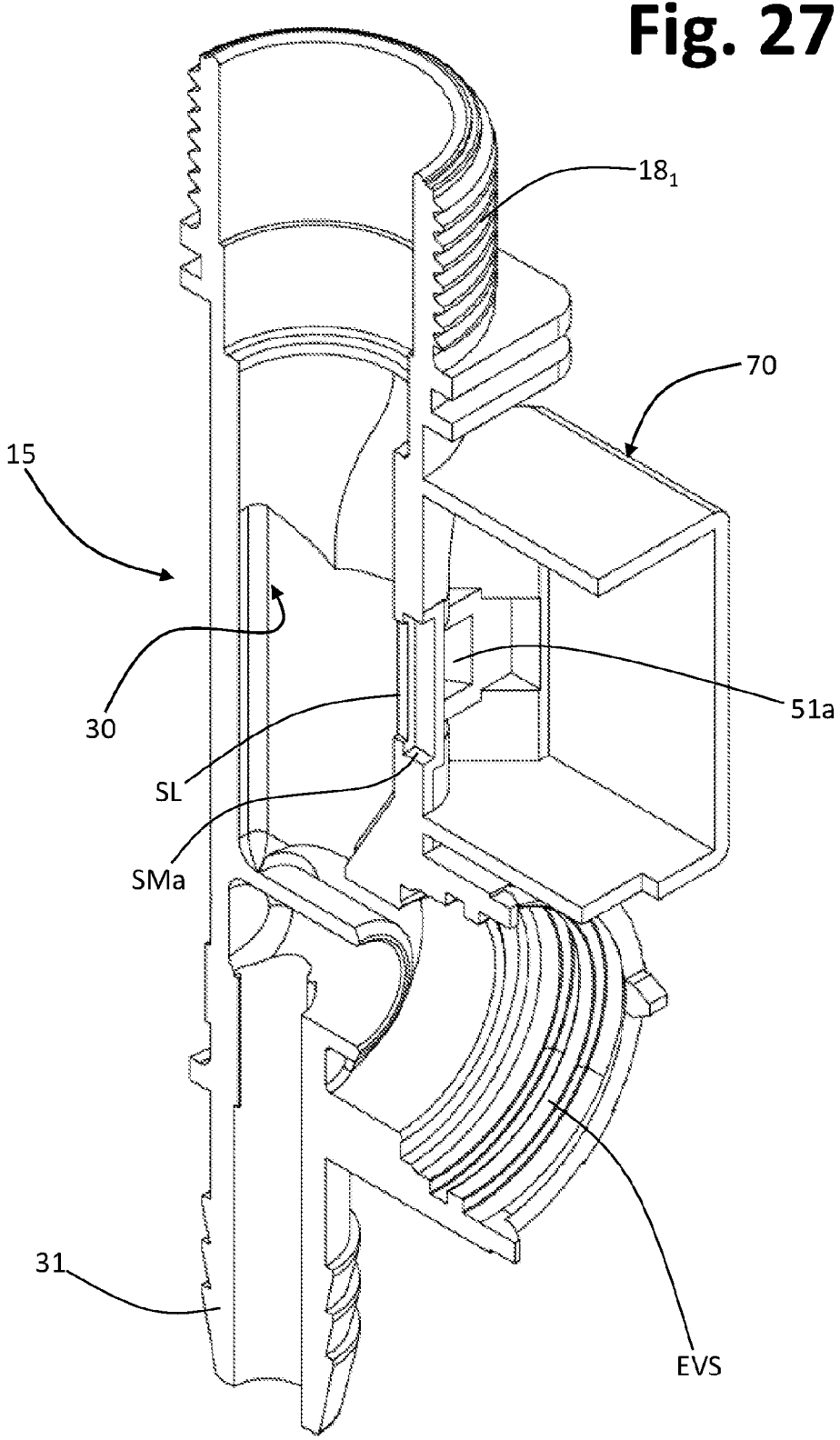
FIG. 27 is a sectioned perspective view of the hydraulic body of FIGS. 24-26.

In FIGS. 24-26 a volumetric control device according to the invention, for example a metering device, designated by 10', is shown limitedly to its hydraulic or connection body 15 designed for connection with an attachment of the liquid source or water mains, this body being shown in section in FIG. 27. In various embodiments, the device 10' can however comprise a housing, for example of a type similar to that shown in FIG. 16 or 19 (obviously in the absence of the prearrangement required for the connection of an outer pipe and also with a different arrangement of the cable of the device cable). In other embodiments the device 10', even without its own housing, can be mounted directly in the hydraulic system or on the served appliance.

The connector body 15, preferably of electrically insulating material, for example a moulded thermoplastic material, can be formed in two pieces as previously described, or in a single piece, as in the example illustrated in the figures, to define the duct 30 for the water. Also in this case the body 15 defines a volume 70 for housing the flow sensor components, a mounting seat (indicated by EVS in FIG. 27) of the electric valve EV and the corresponding open/close member SH.

Also in the illustrated case the non-mechanical flow sensor comprises a detection arrangement 40, with a support 41, preferably planar, and an electromagnetic arrangement 50 of the type previously described. As can also be seen in FIG. 28, the support 41 in this case only carries the electrodes 42 for the detection of the potential difference, as well as the possible arrangement or sensor for detecting the magnitude of the magnetic field, for example in the form of a measuring coil (46-46a, FIG. 29). In various embodiments, the circuit support 25 is mounted at one end of the housing 70. Preferably, the circuit support 25 is prearranged for connection to the supply terminals of the electric valve, these terminals being indicated by EV1 in FIGS. 24-26.

In the exemplified case, the ring-nut 18 of FIG. 16-18 or 19-21 is replaced by a threaded upper portion $18_1$ of the body 15, but in other embodiments not shown, the aforementioned ring-nut may however be provided. Preferably, but not necessarily, in the upper portion of the duct 30 a filter F and a flow regulator FR are housed, both of a conception known per se. On the opposite side with respect to the threaded portion $18_t$, the connector body 15 defines an outlet attachment 31, for the coupling of the water pipe, indicated with 13 only in FIG. 25. If necessary, the pipe 13 may be mechanically fixed to the attachment 13, or to another respective attachment, by means of a hose clamp or a ring, optionally also with a sleeve of the type previously indicated by 13. Note that, when the device 10' is mounted directly on a domestic appliance, the assembly configuration could be reversed with respect to that shown (i.e., with the body 15 turned upside down with respect to what is illustrated in the figures, or with the attachment 31 acting as an inlet and the threaded portion 18$_1$ acting as an outlet, in which case the filter F and the regulator FR will be shifted accordingly or omitted).

In various embodiments, the circuit support 25 has, preferably in its part outside the volume 70, a connecting connector 26, for a multi-conductor cable, required for the supply of the electric valve EV, of the circuit implemented on the same support 25, as well as for supplying the flow sensor 40, 50 and for transporting the related signals. In the case in which the electromagnetic arrangement 50 is not powered by batteries, as in the exemplified case, the aforementioned cable preferably comprises at least five conductors, two of which for the solenoid of the electric valve EV and three for the flow sensor (power supply+signal representative of flow-rate).

The connector 26 can also provide a programming contact, for writing parameters, as previously indicated. In fact, it should be noted that what previously described in relation to possible methods of electrical connection, testing and calibration of the on-board electronics of the hydraulic control device subject of the invention is also applicable in the case of the devices of FIGS. 24-29.

In the sectioned view of FIG. 27, part of a through opening SL is visible, for example in the form of a substantially rectangular slot, through which the support 41 of the flow sensor is inserted transversely, with its major faces substantially parallel to the direction of the flow of the water. The support 41 is inserted in such a way that its region provided with the electrodes 42 is inside the duct 30. In these implementations, since the electrodes 43 previously described are not provided, it is not strictly necessary to provide in the duct 30 two openings SL. Also in FIG. 27 a seat SMa is partially visible, in a position corresponding to the through opening SL, for the positioning of the means SM for ensuring the hydraulic seal between the support 41 and the connector body 15.

In the case illustrated in FIGS. 24-27, the duct 30 does not provide for a flow detection region having a variable section, such as the one previously described, formed by the areas 30a, 30b and 30c with different passage sections. However, in embodiments not represented herein, this detection region can be defined in the duct 30, in which case the connector body will be preferably formed in two parts hydraulically and mechanically coupled to each other (similarly to parts 15$_1$ and 15$_2$ previously described).

Figure 28:
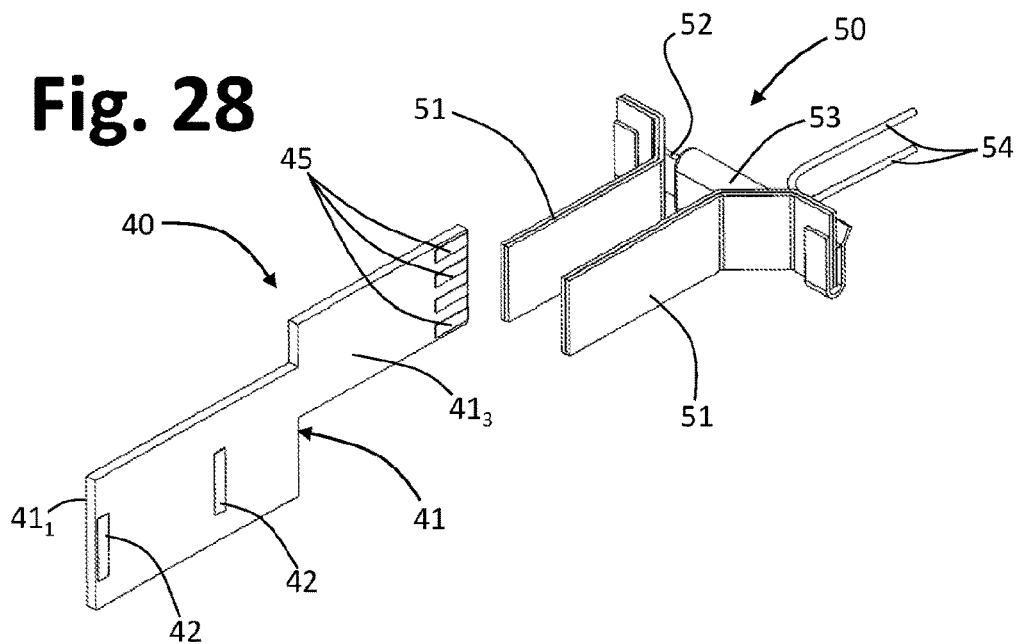
FIG. 28 is a schematic exploded view of a flow detection unit of a hydraulic control device according to possible embodiments of the invention.

FIG. 28 shows the parts of an electromagnetic induction flow sensor that can be used in various embodiments, i.e. the detection arrangement 40 and the electromagnetic arrangement 50, similar to those already described above. As mentioned, in applications on hydraulic control devices that do not provide functions of detection of water leakages, the electrodes 42 can be provided on the support 41 and the electrodes 43 can be omitted, as in FIG. 28. The length of the support 41 can therefore be lower compared to the one shown in FIG. 8.

Figure 29:
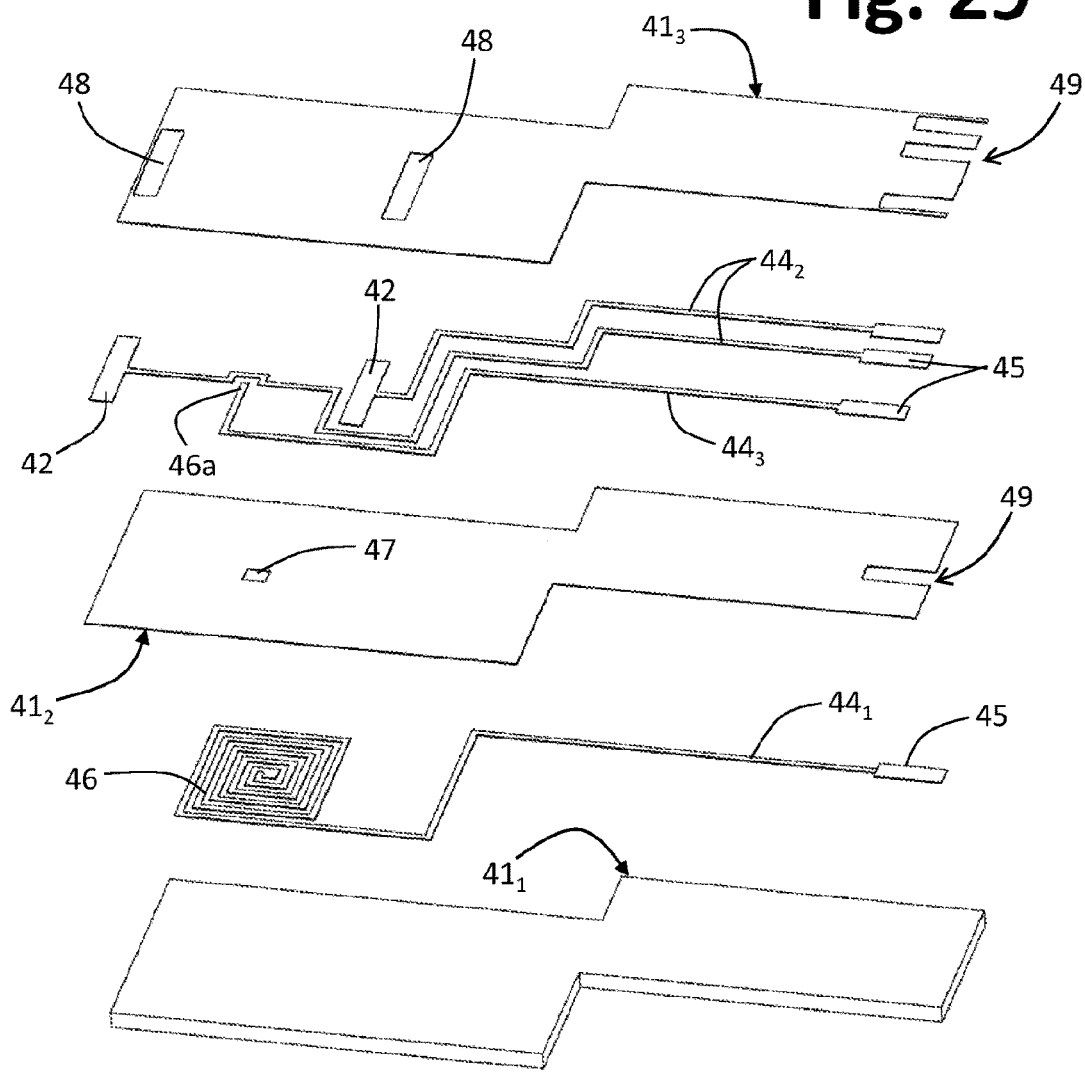
FIG. 29 is a schematic exploded view of a support belonging to a flow detection unit of a hydraulic control device according to possible embodiments of the invention.

FIG. 29 illustrates how, also in the case of the embodiments of the type of those of FIGS. 24-27, the support 41 can have a plurality of superimposed layers 41$_1$, 41$_2$ e 41$_3$ of electrically insulating material, with corresponding electric tracks 44$_1$, 44$_2$ e 44$_3$ required to form the pads 45, the coil 46 for measuring the magnetic field, the electrodes 42 and the contact 46a. It will therefore be appreciated that what has been previously described with reference to FIG. 10, it is also applicable in relation to FIG. 29 (obviously with the exception of the part concerning the electrodes 43).

As it can be understood, operation of the flow sensor 40-50 of the hydraulic control device 10' of FIGS. 24-29 is the same as that already described above. In addition to measuring the volume of water passing through the device 10', the flow sensor can be used also as a "virtual sensor" for water leaks, as previously described.

Finally, it will be appreciated that in the case of devices for volumetric control only, such as metering devices, for example of the type described with reference to FIGS. 24-29, the electromagnetic induction flow sensor 40, 50 can be replaced with a different type of non-mechanical sensor, particularly of the hot-wire or hot-film type, for example as described above with reference to FIGS. 22-23.

From the above description, the characteristics of the present invention emerge clearly, as likewise do its advantages.

The hydraulic control device according to the invention, which envisages a non-mechanical flow sensor, is advantageous as compared to the known art, which is based upon the use of impeller sensors that the present Applicant has found to be subject to wear, with consequent alteration of the measurement and/or sticking.

The flow sensors proposed in fact enable measurement of the flow-rate of a liquid without moving parts, and hence with greater reliability as compared to known mechanical technologies. These sensors are moreover able to measure even very low flow-rates (of the order of millilitres per minute), which enables, for example, detection of minor leaks or dripping of the electric valve of the device. The possible presence of a sensor designed to detect leaks of water inside the hydraulic control device, when of the double-pipe type performing anti-flooding functions, makes it possible to recognize in a rapid and simple way the origin of such leaks, i.e., to discriminate whether they are due to a fault or malfunctioning of a component of the household appliance hydraulically supplied via the device forming the subject of the invention, or else to a fault or malfunctioning of the device itself.

It is clear that numerous variations may be made by the person skilled in the art to the hydraulic control device described by way of example, without thereby departing from the scope of the invention as defined in the ensuing claims.

It will be appreciated, for example, that a detection chamber of the type previously designated by 35, even when implemented in a hydraulic or connector unit downstream of the outer pipe, does not necessarily have to be provided with an outlet.

In the case of integration of the non-mechanical flow sensor and/or of the leakage sensor in a hydraulic or connector unit upstream of the inner pipe, the corresponding unit downstream can have a structure simpler than the one illustrated previously (as has been said, in fact, a detection chamber of the type previously designated by 35 could be itself provided in the hydraulic or connector unit upstream of the inner pipe, with the gap between the pipes that is closed at the distal end). For example, the connection downstream could be prearranged only for providing closing of the gap between the two pipes (in any case with a fluid-tight passage for the electrical cable 21), and for providing the hydraulic connection of the inner pipe with the inlet connector for the water of the water-conducting household appliance supplied thereby (for example, in a way similar to what is illustrated in FIG. 18 of WO 2012/140592, or else in FIG. 8 of DE 3618258). In the case of devices with gap between the two pipes open at the lower end, the connection downstream could also consist of a simple arrangement for mechanical and hydraulic coupling of the inner pipe with the inlet connector for the water of the electrical household appliance supplied thereby (for example, with a ring-nut), and with the lower end of the outer pipe, i.e., the gap between the two pipes, that simply faces a collection container or tray provided within the appliance (for example, in a way similar to what is illustrated in FIG. 1 of EP1028190 A). The aforesaid arrangement for mechanical and hydraulic coupling of the inner pipe could also consist in a simple elastomeric sleeve (as in FIGS. 1-2 of EP 1 798 326 A), or in the limit in a simple clamp or fixing ring for the distal end of the inner pipe (as in FIG. 1 or FIG. 5 of DE 3618258). The connection downstream could also be part of the appliance supplied via the device according to the invention.

The valve arrangement of the device, for example, an electric valve of the type previously designated by EV, could be integrated in the hydraulic or connector unit downstream of the inner pipe or pipe for liquid supply, instead of in the unit upstream thereof.

Individual characteristics mentioned with reference to embodiments described previously may be combined together in other embodiments. Moreover, characteristics and functions indicated for the hydraulic or connector unit upstream may be applied to the hydraulic or connector unit downstream, and vice versa.

The invention claimed is:

1. A hydraulic control device for liquid-conducting household appliances or systems, the device being designed for connection between a source of a liquid and a liquid-conducting household appliance or system, the device comprising:
    at least one hydraulic unit, having a hydraulic body defining a duct for a flow of the liquid, said duct having an inlet and an outlet and being at least partially defined with an electrically insulating material,
    an electrical valve arrangement on the hydraulic body, which is electrically switchable between a closing position and an opening position, to prevent or enable, respectively, passage of the flow of the liquid between the inlet and the outlet of said duct,
    a flow sensor on the hydraulic body, for measuring the flow rate of the whole flow of the liquid between said inlet and said outlet,
    wherein the flow sensor is a non-mechanical flow sensor comprising at least two electrical detection elements, prearranged for contact with the liquid that flows in said duct, the non-mechanical flow sensor including at least one support for at least one of the at least two electrical detection elements,
    wherein the non-mechanical flow sensor is an electromagnetic-induction flow sensor which comprises:
    an electromagnetic arrangement, operable for generating an electromagnetic field in a direction transverse to a direction of the flow of the liquid in said duct, and
    a detection arrangement, comprising at least two electrodes for detecting a potential difference induced by the flow of the liquid through said electromagnetic field, the at least two electrodes constituting said at least two electrical detection elements, the detection arrangement including the at least one support,
    wherein the electromagnetic arrangement has two yokes arranged parallel to each other, between which the electromagnetic field is generated,
    wherein the duct has a detection region at which the duct has an oblong cross-sectional shape, with a major cross-sectional dimension and a minor cross-sectional dimension,
    wherein the electromagnetic arrangement is mounted outside the duct in a position corresponding to the detection region,
    wherein the hydraulic body defines mounting seats for said two yokes outside said duct, such that said two yokes are mounted from outside the duct in a position corresponding to the detection region thereof, the mounting seats being parallel along the major cross-sectional dimension and spaced from one another,
    wherein the hydraulic body has a tubular wall which defines said duct, the tubular wall having two opposite through openings in a position corresponding to said detection region, the two opposite through openings being configured to enable the liquid to contact a respective part of the at least two electrodes, said two opposite through openings being located at the detection region spaced from one another in the major cross-sectional dimension,
    wherein each mounting seat is a slit preformed in said tubular wall, such that a part of the electrically insulating material insulates the corresponding yoke at a face thereof opposite to the duct,
    wherein a sealing element is provided at each of said two opposite through openings, for providing fluid tightness between the at least one support and the hydraulic body, and
    wherein two positioning seats are defined in the hydraulic body, each in a position corresponding to each of said two opposite through openings, for the positioning of the sealing elements.

2. The device according to claim 1, wherein the two yokes are connected together by means of a third yoke set on which is an electrical coil having corresponding supply conductors.

3. The device according to claim 1, wherein the hydraulic body is made of moulded thermoplastic material to integrally define said mounting seats, said two opposite through openings, and said positioning seats.

4. A water-conducting household appliance or system, comprising the hydraulic control device according to claim 1.

* * * * *